Aug. 17, 1965 J. C. HOLLIS 3,200,921

CONTROLS FOR MACHINE TOOLS

Filed Feb. 15, 1961 13 Sheets-Sheet 1

INVENTOR.
John C. Hollis,
BY Wolfe, Hubbard,
Voit & Osann
Attorneys.

Aug. 17, 1965 J. C. HOLLIS 3,200,921

CONTROLS FOR MACHINE TOOLS

Filed Feb. 15, 1961 13 Sheets-Sheet 2

INVENTOR.
John C. Hollis,
BY Wolfe, Hubbard, Voit & Osann
Attorneys.

INVENTOR.
John C. Hollis,
BY Wolfe, Hubbard,
Voit & Osann
Attorneys.

Aug. 17, 1965 J. C. HOLLIS 3,200,921

CONTROLS FOR MACHINE TOOLS

Filed Feb. 15, 1961 13 Sheets-Sheet 4

INVENTOR.
John C. Hollis,
BY Wolfe, Hubbard,
Voit & Osann
Attorneys.

INVENTOR.
John C. Hollis,
BY Wolfe, Hubbard, Voit & Osann
Attorneys.

CONTROLS FOR MACHINE TOOLS

Filed Feb. 15, 1961 13 Sheets-Sheet 6

INVENTOR.
John C. Hollis,
BY Wolfe, Hubbard, Voit & Osann
Attorneys.

Aug. 17, 1965 J. C. HOLLIS 3,200,921

CONTROLS FOR MACHINE TOOLS

Filed Feb. 15, 1961 13 Sheets-Sheet 7

INVENTOR.
John C. Hollis,
BY Wolfe, Hubbard,
Voit & Osann
Attorneys.

Aug. 17, 1965 | J. C. HOLLIS | 3,200,921

CONTROLS FOR MACHINE TOOLS

Filed Feb. 15, 1961 | 13 Sheets-Sheet 8

| MOMENT FROM EXTREME POSITION | CONVERTER SWITCHES | | | | | | | | | | | | | | | |
|---|---|---|---|---|---|---|---|---|---|---|---|---|---|---|---|---|
| | .001 | .002 | .004 | .008 | 1/64 | 1/32 | 1/16 | 1/8 | 1/4 | 1/2 | 1 | 2 | 4 | 8 | 16 | 32 |
| 0 | 0 | 0 | 0 | 0 | 0 | 0 | 0 | 0 | 0 | 0 | 0 | 0 | 0 | 0 | 0 | 0 |
| 1/1024 | 1 | 0 | 0 | 0 | 0 | 0 | 0 | 0 | 0 | 0 | 0 | 0 | 0 | 0 | 0 | 0 |
| 2/1024 | 0 | 1 | 0 | 0 | ↑ | ↑ | ↑ | ↑ | ↑ | ↑ | ↑ | ↑ | ↑ | ↑ | ↑ | ↑ |
| 3/1024 | 1 | 1 | 0 | 0 | | | | | | | | | | | | |
| 4/1024 | 0 | 0 | 1 | 0 | | | | | | | | | | | | |
| 5/1024 | 1 | 0 | 1 | 0 | 0 | 0 | 0 | 0 | | | | | | | | |
| 6/1024 | 0 | 1 | 1 | 0 | | | | | | | | | | | | |
| 7/1024 | 1 | 1 | 1 | 0 | | | | | | | | | | | | |
| 8/1024 | 0 | 0 | 0 | 1 | | | | | | | | | | | | |
| 9/1024 | 1 | 0 | 0 | 1 | ↓ | ↓ | ↓ | ↓ | | | | | | | | |
| 10/1024 | 0 | 1 | 0 | 1 | 0 | 0 | 0 | 0 | | | | | | | | |
| .015 | 1 | 1 | 1 | 1 | 0 | 0 | 0 | 0 | 0 | 0 | 0 | 0 | 0 | 0 | 0 | 0 |
| 1/64 | 0 | 0 | 0 | 0 | 1 | 0 | 0 | 0 | | | | | | | | |
| .030 | 1 | 1 | 1 | 1 | 1 | 0 | 0 | 0 | | | | | | | | |
| 1/32 | 0 | 0 | 0 | 0 | 0 | 1 | 0 | 0 | | | | | | | | |
| .061 | 1 | 1 | 1 | 1 | 1 | 1 | 0 | 0 | | | | | | | | |
| 1/16 | 0 | 0 | 0 | 0 | 0 | 0 | 1 | 0 | | | | | | | | |
| .124 | 1 | 1 | 1 | 1 | 1 | 1 | 1 | 0 | | | | | | | | |
| 1/8 | 0 | 0 | 0 | 0 | 0 | 0 | 0 | 1 | ↓ | ↓ | ↓ | ↓ | | | | |
| .249 | 1 | 1 | 1 | 1 | 1 | 1 | 1 | 1 | 0 | 0 | 0 | 0 | | | | |
| 1/4 | 0 | 0 | 0 | 0 | 0 | 0 | 0 | 0 | 1 | 0 | 0 | 0 | | | | |
| .499 | 1 | 1 | 1 | 1 | 1 | 1 | 1 | 1 | 1 | 0 | 0 | 0 | | | | |
| 1/2 | 0 | 0 | 0 | 0 | 0 | 0 | 0 | 0 | 0 | 1 | 0 | 0 | | | | |
| .999 | 1 | 1 | 1 | 1 | 1 | 1 | 1 | 1 | 1 | 1 | 0 | 0 | | | | |
| 1 | 0 | 0 | 0 | 0 | 0 | 0 | 0 | 0 | 0 | 0 | 1 | 0 | | | | |
| 1.999 | 1 | 1 | 1 | 1 | 1 | 1 | 1 | 1 | 1 | 1 | 1 | 0 | | | | |
| 2 | 0 | 0 | 0 | 0 | 0 | 0 | 0 | 0 | 0 | 0 | 0 | 1 | ↓ | ↓ | ↓ | ↓ |
| 3.999 | 1 | 1 | 1 | 1 | 1 | 1 | 1 | 1 | 1 | 1 | 1 | 1 | 0 | 0 | 0 | 0 |
| 4 | 0 | 0 | 0 | 0 | 0 | 0 | 0 | 0 | 0 | 0 | 0 | 0 | 1 | 0 | 0 | 0 |
| 7.999 | 1 | 1 | 1 | 1 | 1 | 1 | 1 | 1 | 1 | 1 | 1 | 1 | 1 | 0 | 0 | 0 |
| 8 | 0 | 0 | 0 | 0 | 0 | 0 | 0 | 0 | 0 | 0 | 0 | 0 | 0 | 1 | 0 | 0 |
| 15.999 | 1 | 1 | 1 | 1 | 1 | 1 | 1 | 1 | 1 | 1 | 1 | 1 | 1 | 1 | 0 | 0 |
| 16 | 0 | 0 | 0 | 0 | 0 | 0 | 0 | 0 | 0 | 0 | 0 | 0 | 0 | 0 | 1 | 0 |
| 31.999 | 1 | 1 | 1 | 1 | 1 | 1 | 1 | 1 | 1 | 1 | 1 | 1 | 1 | 1 | 1 | 0 |
| 32 | 0 | 0 | 0 | 0 | 0 | 0 | 0 | 0 | 0 | 0 | 0 | 0 | 0 | 0 | 0 | 1 |
| 47.999 | 1 | 1 | 1 | 1 | 1 | 1 | 1 | 1 | 1 | 1 | 1 | 1 | 1 | 1 | 0 | 1 |
| 48 | 0 | 0 | 0 | 0 | 0 | 0 | 0 | 0 | 0 | 0 | 0 | 0 | 0 | 0 | 1 | 1 |
| 63.999 | 1 | 1 | 1 | 1 | 1 | 1 | 1 | 1 | 1 | 1 | 1 | 1 | 1 | 1 | 1 | 1 |

STATE AT Y- OR Z- LIMIT POSITIONS

INVENTOR.
John C. Hollis,
BY Wolfe, Hubbard, Voit & Osann
Attorneys.

INVENTOR.
John C. Hollis,
BY Wolfe, Hubbard, Voit & Osann
Attorneys.

Aug. 17, 1965 J. C. HOLLIS 3,200,921

CONTROLS FOR MACHINE TOOLS

Filed Feb. 15, 1961 13 Sheets-Sheet 10

INVENTOR.
John C. Hollis,
BY Wolfe, Hubbard,
Voit & Osann
Attorneys.

INVENTOR.
John C. Hollis,
BY Wolfe, Hubbard, Voit & Osann
Attorneys.

CONTROLS FOR MACHINE TOOLS

Filed Feb. 15, 1961 13 Sheets-Sheet 12

INVENTOR.
John C. Hollis,
BY Wolfe, Hubbard, Voit & Osann
Attorneys.

| STEPS | U | D | I | O | IND. | T | FEED 1S | FEED 1F | FEED 2 | FEED 3 | FEED 4 | | SPEED 1 | SPEED 1A | SPEED 2 | SPEED 3 | SPEED 4 |
|---|---|---|---|---|---|---|---|---|---|---|---|---|---|---|---|---|---|
| 1 | | | X | | 1 | X | | | | | | TRAVERSE | | | | | |
| 2 | | X | | | | | + | .036 | | | | | + | 160 | + | | |
| 3 | X | | | | | X | | | | | | TRAVERSE | | | | | |
| 4 | | | | | 2 | | | | | | | INDEX | | | | | |
| 5 | | | | X | | | | | | | | SLOWDOWN SPEED | + | 160 | + | | |
| 6 | | X | | | | | + | .004 | + | + | + | | + | 320 | | | |
| 7 | X | | | | | | | | | | | | + | 320 | | | |
| 8 | | | | | 4 | | | | | | | INDEX | | | | | |
| 9 | | X | | X | | X | | | | | | TRAVERSE | | | | | |
| 10 | | X | | | | | | + | .072 | | | | + | 28 | + | + | |
| 11 | | | X | | | | | | | | | SLOWDOWN SPEED | + | 28 | + | + | |
| 12 | X | | | | | X | | | | | | TRAVERSE | | | | | |
| 13 | | | | | 5 | | | | | | | INDEX | | | | | |
| 14 | | X | | | | X | | | | | | TRAVERSE | | | | | |
| 15 | | | X | | | | + | .036 | | | | | + | 34 | + | | + |
| 16 | X | | | | | | | | | | | SLOWDOWN SPEED | + | 34 | + | | + |
| 17 | | | X | | | | + | .018 | | | + | | + | 112 | | + | + |
| 18 | X | | | | | X | | | | | | TRAVERSE | | | | | |
| 19 | | | | | 1 | | | | | | | INDEX | | | | | |
| 20 | | | | X | | X | | | | | | TRAVERSE | | | | | |

FIG. 29.

SLOWDOWN EXAMPLE--END POINT=1"
CONVERTER SWITCHES

| | FINE | | | | MED. FINE | | | | MED. COARSE | | | |
|---|---|---|---|---|---|---|---|---|---|---|---|---|
| | .001 | .002 | .004 | .008 | 1/64 | 1/32 | 1/16 | 1/8 | 1/4 | 1/2 | 1 | 2 |
| FINAL STATE OF CONVERTER SWITCHES | 0 | 0 | 0 | 0 | 0 | 0 | 0 | 0 | 0 | 0 | X | 0 |
| STATE AT 1"-.250=.750 | X | X | X | X | 0 | 0 | 0 | 0 | X | X | 0 | 0 |
| STATE AT 1"-.249=.751 | X | 0 | 0 | 0 | 0 | 0 | 0 | 0 | 0 | 0 | X | 0 |
| STATE AT 1"-.248=.752 | 0 | X | 0 | 0 | 0 | 0 | 0 | 0 | | | | |
| STATE AT 1"-.247=.753 | X | X | 0 | 0 | 0 | 0 | 0 | 0 | | | | |
| | | | | | | | | | | | | |
| STATE AT 1"-.001=.999 | X | X | X | X | X | X | X | X | | | | |
| | | | | | | | | | | | | |
| STATE AT 1" | 0 | 0 | 0 | 0 | 0 | 0 | 0 | 0 | | | | |

SHIFTS STATE AHEAD OF ACTUAL LEAD SCREW POSITION BECAUSE OF BACKLASH-CAUSES "C" LINE TO GO DEAD

CAUSES "F" LINE TO GO DEAD AT END POINT=1"

FIG. 30.

INVENTOR.
John C. Hollis,
BY Wolfe, Hubbard, Voit & Osann
Attorneys.

3,200,921

CONTROLS FOR MACHINE TOOLS

John C. Hollis, Milwaukee, Wis., assignor to Giddings & Lewis Machine Tool Company, Fond du Lac, Wis., a corporation of Wisconsin Filed Feb. 15, 1961, Ser. No. 89,449
13 Claims. (Cl. 192—142)

This invention relates to improvements in systems for causing machine tools to execute automatically repetitive cycles of machining operations made up of a plurality of successive machining steps.

Control systems have been known heretofore for operating a machine tool automatically to repeat a series of steps initially carried out under the control of a machinist. Such control systems conventionally include means for recording the performance of the machine tool on a suitable medium so that the record may be played back in order to control the tool in the repeat cycle. While the present control system may be classified in general with this known type of system, it is now proposed that the operator will set into control system recording means, the data required to direct the tool to repeat each machining step.

One object of this invention is to provide control means with which a machine tool may be operated in a manner closely simulating the usual manner of operation by hand, so that to set up the program for the repeat cycle, the operator carries out, by hand, a series of steps to machine a workpiece. Another object is to provide a simplified means for an operator to record the data as to each machining step at the time the step is carried out manually without the necessity for extensive calculations to provide data in acceptable form for the machine tool control recording means.

Program preplanning, therefore, may be dispensed with entirely and the machining operation including determining operation sequence, selecting tool elements, and selecting suitable feeds and speeds carried out under the manual direction of the machinist. Widely diverse machine tool operations may be carried out with less complex information storage and tool control system components because the repeat cycle simply mimics the manually directed machining steps.

Another important object is to provide an analog to digital converter for end point control of a machine tool element with an improved means for reducing the velocity of such element before the element reaches an end point or stopping position, thereby avoiding overshoot.

Other objects and advantages will become apparent as this description proceeds, taken with the drawings, in which:

FIGURE 1 is an elevational view illustrating a vertical turret lathe with a control system according to this invention;

FIG. 2 diagrammatically illustrates the tool drive;

Figure 6:
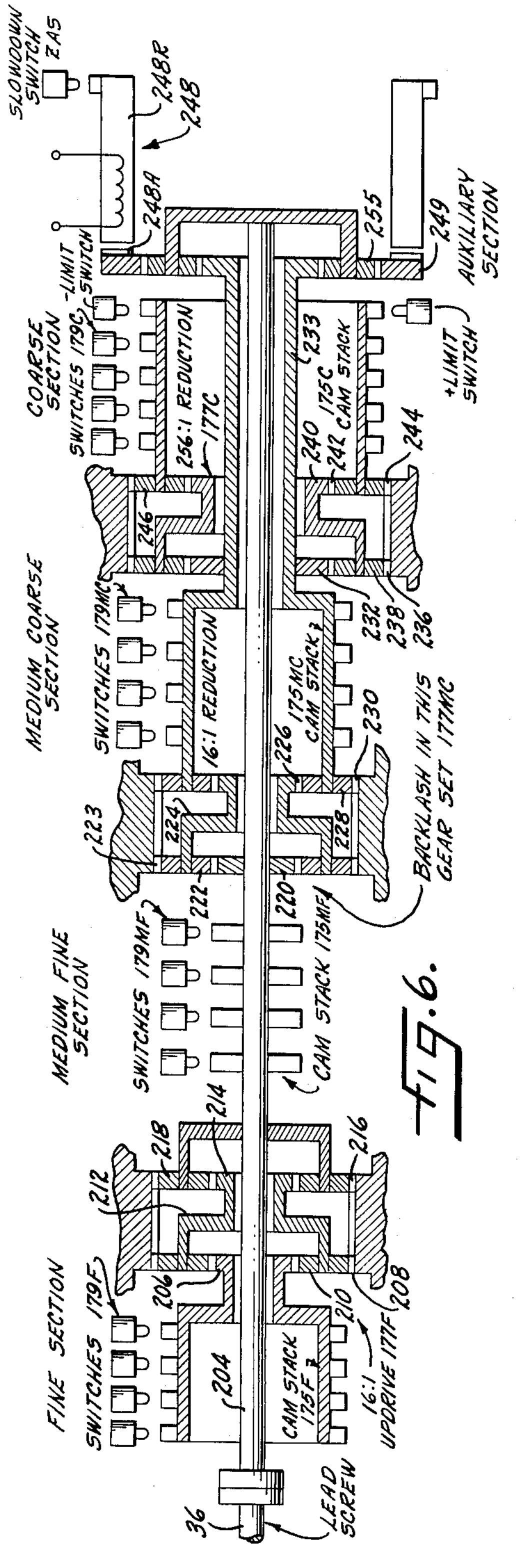
Figure 7:
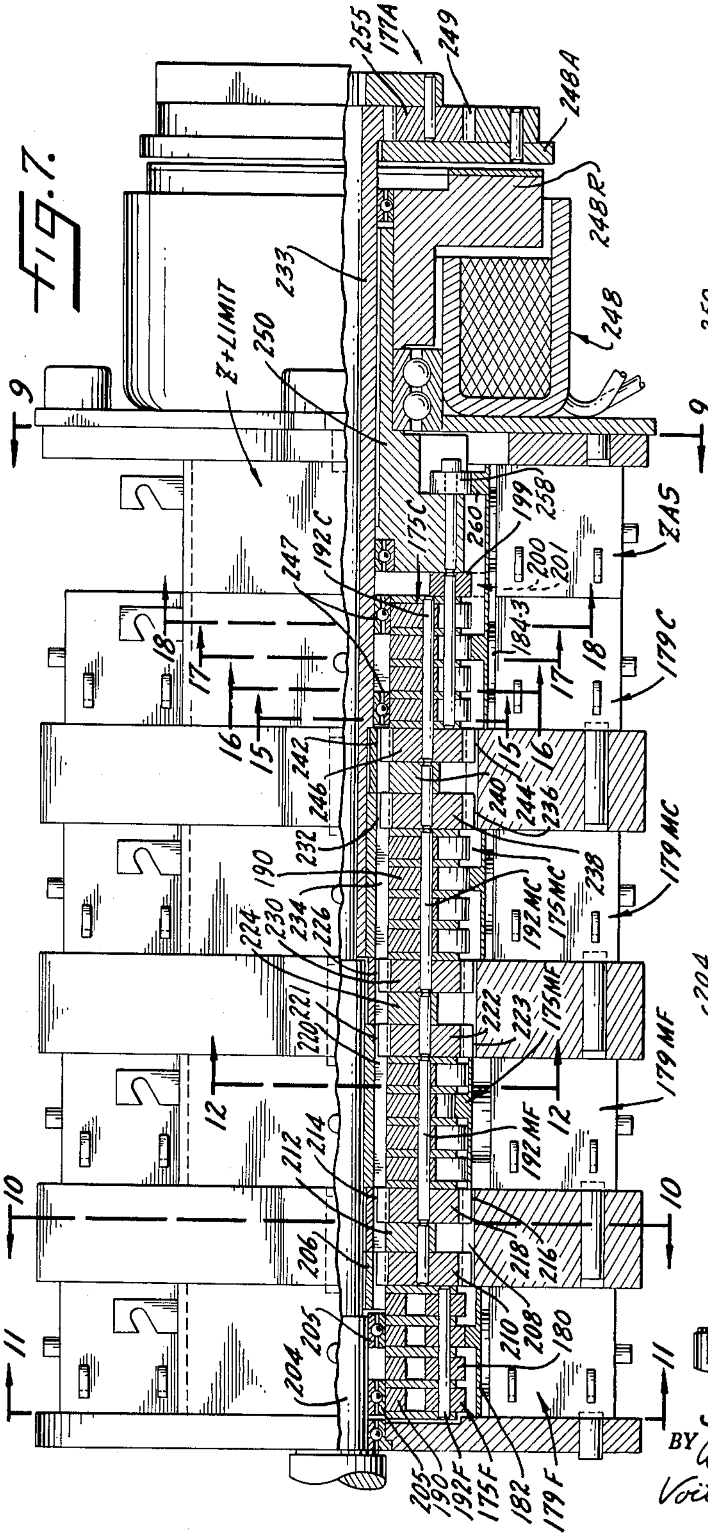
Figure 8:
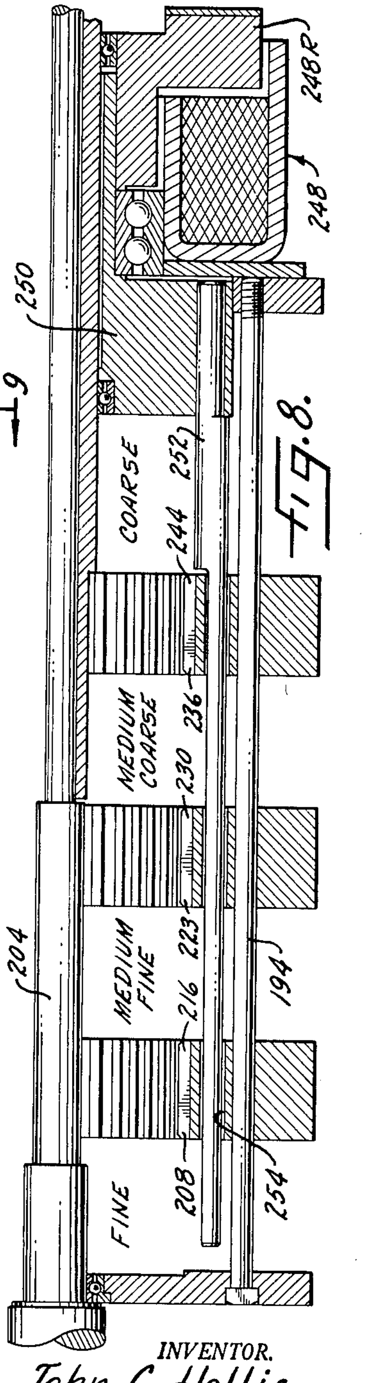
Figures 9, 10:
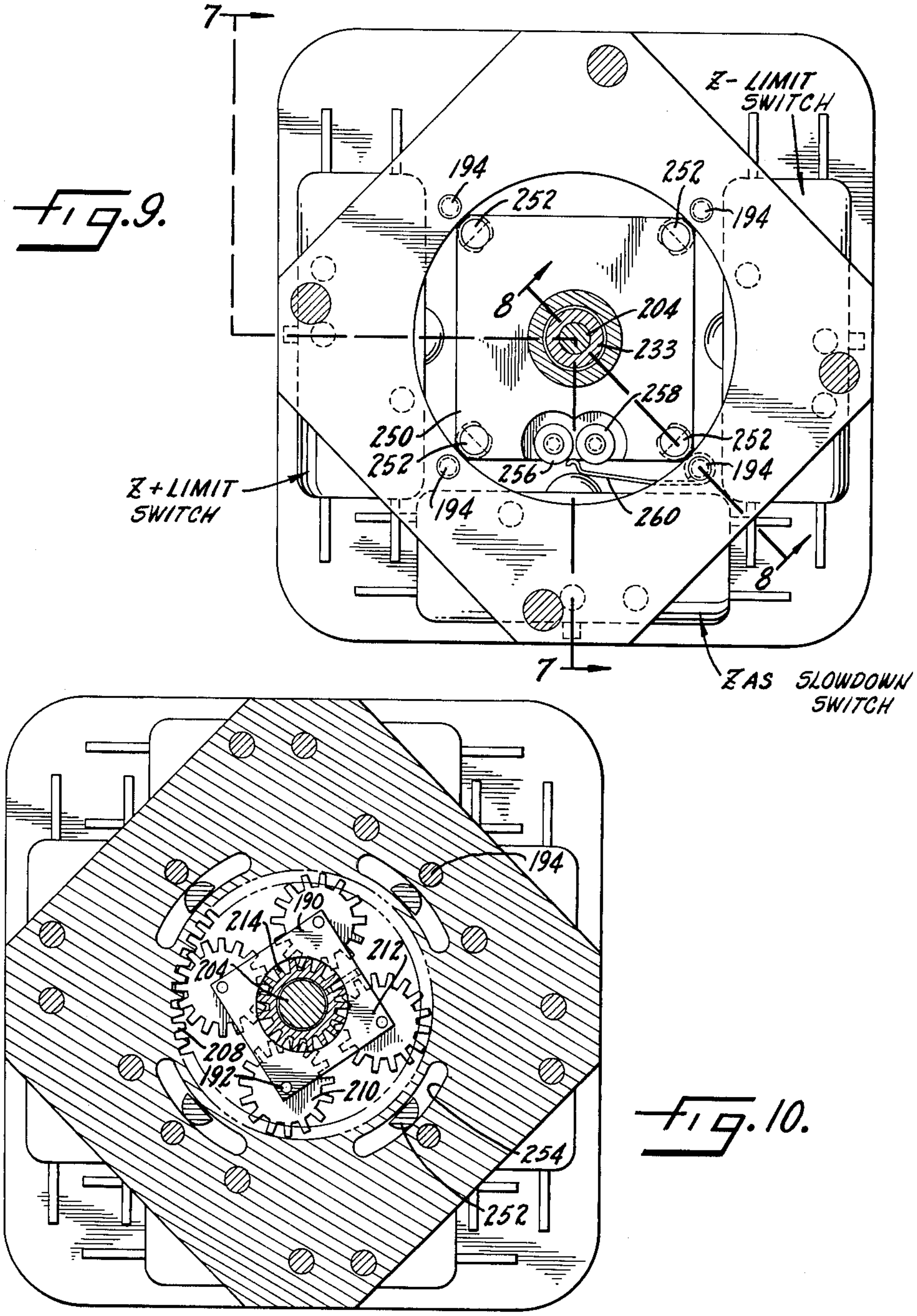
Figures 11, 12, 13, 14, 20:
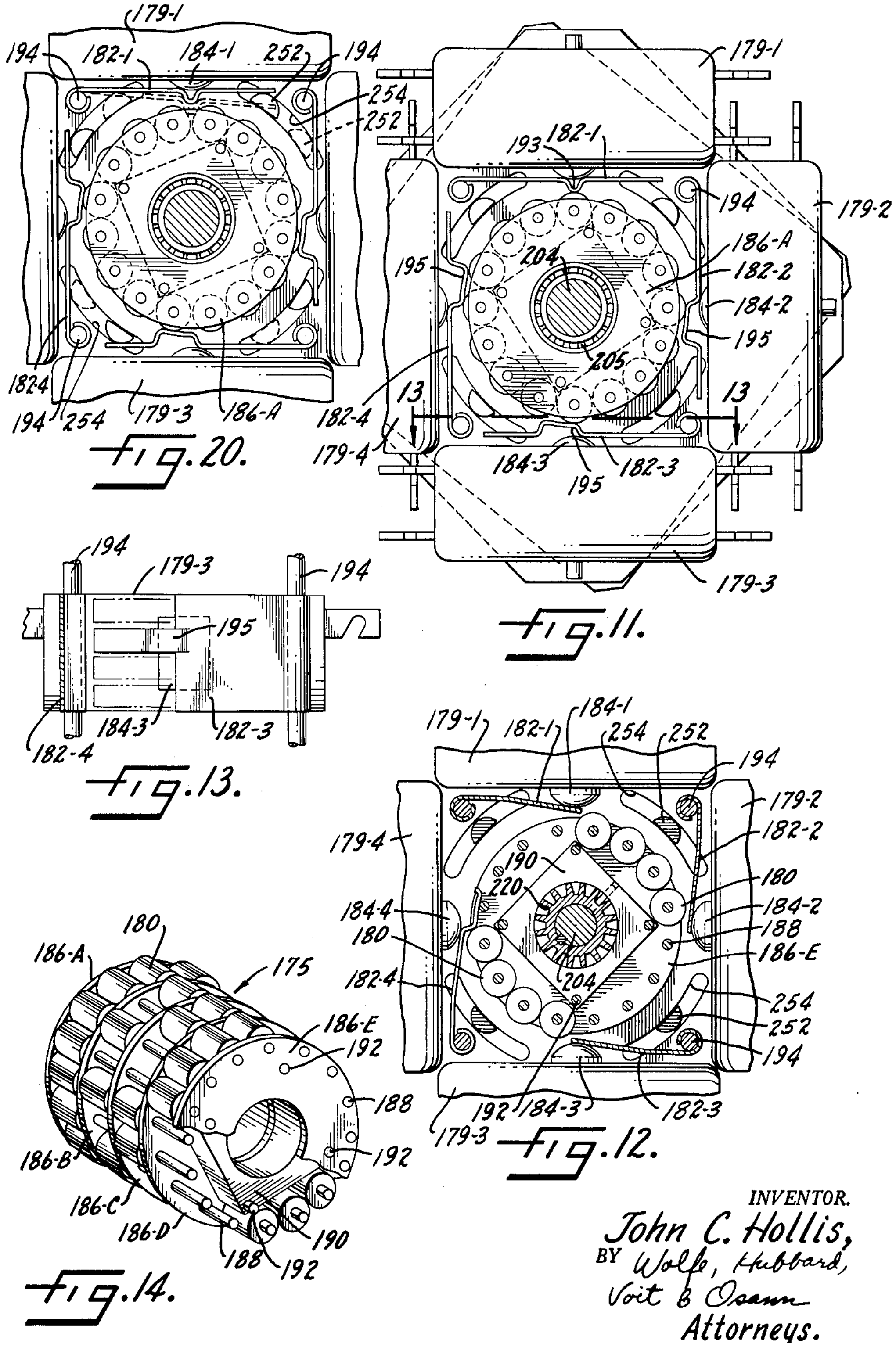
Figures 15, 16, 17, 18, 19:
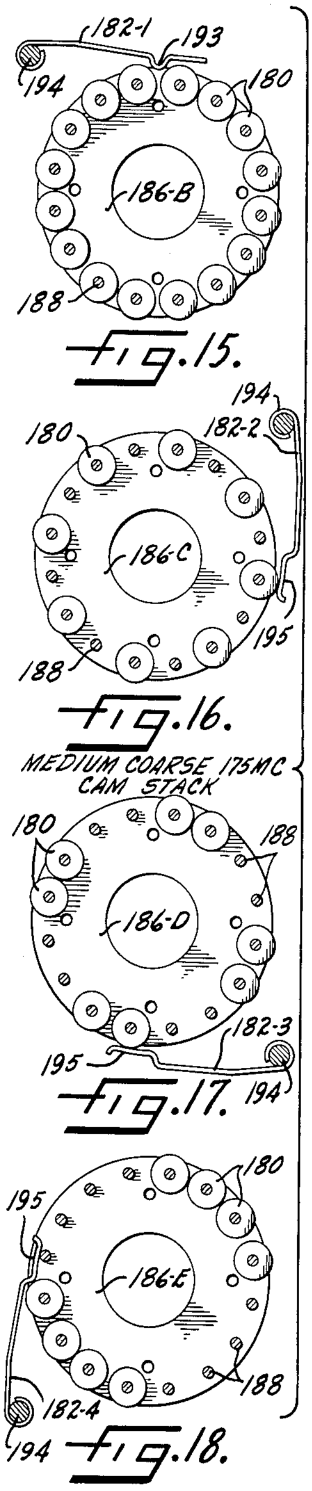
Figure 21:
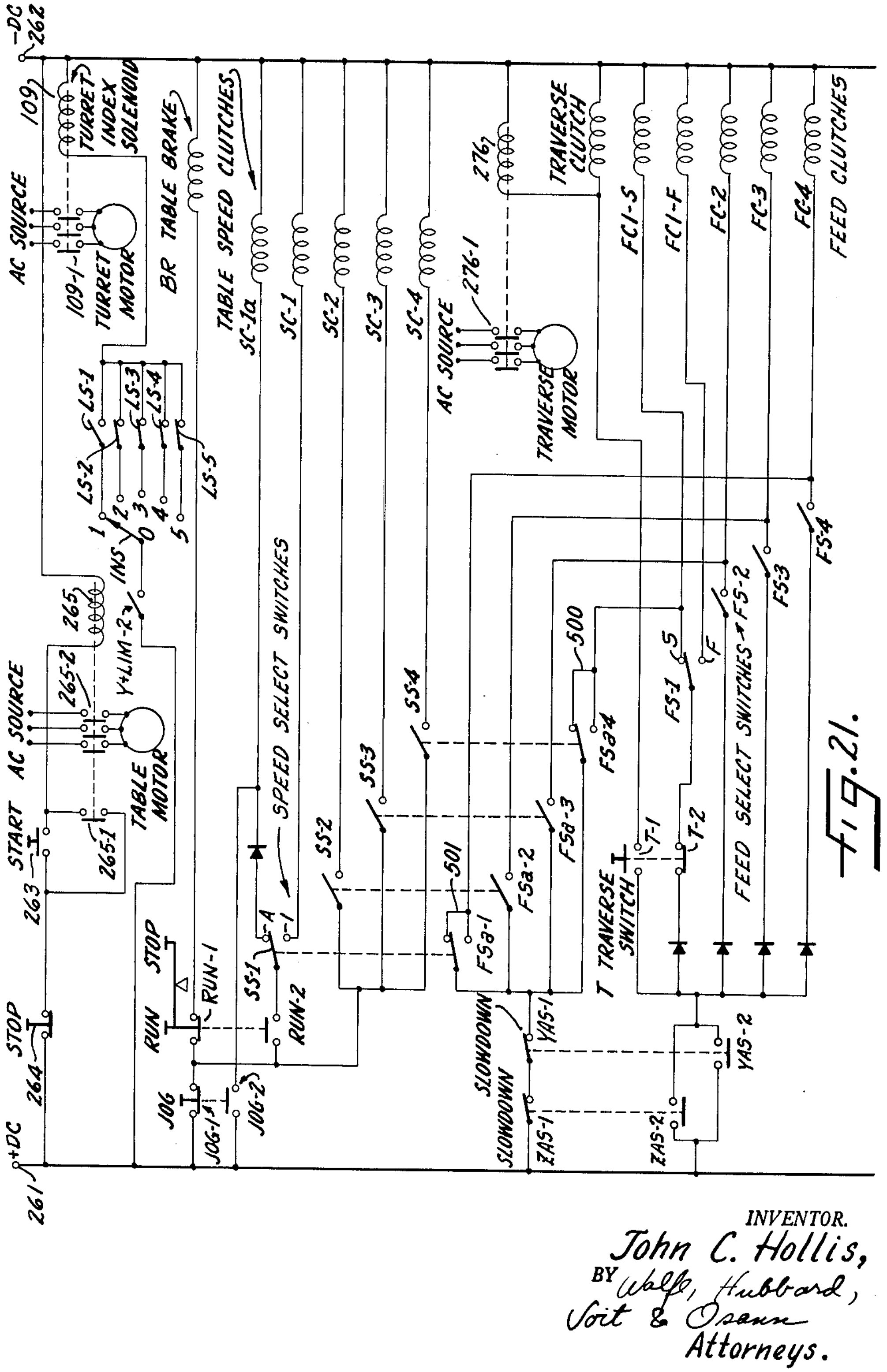
Figure 22:
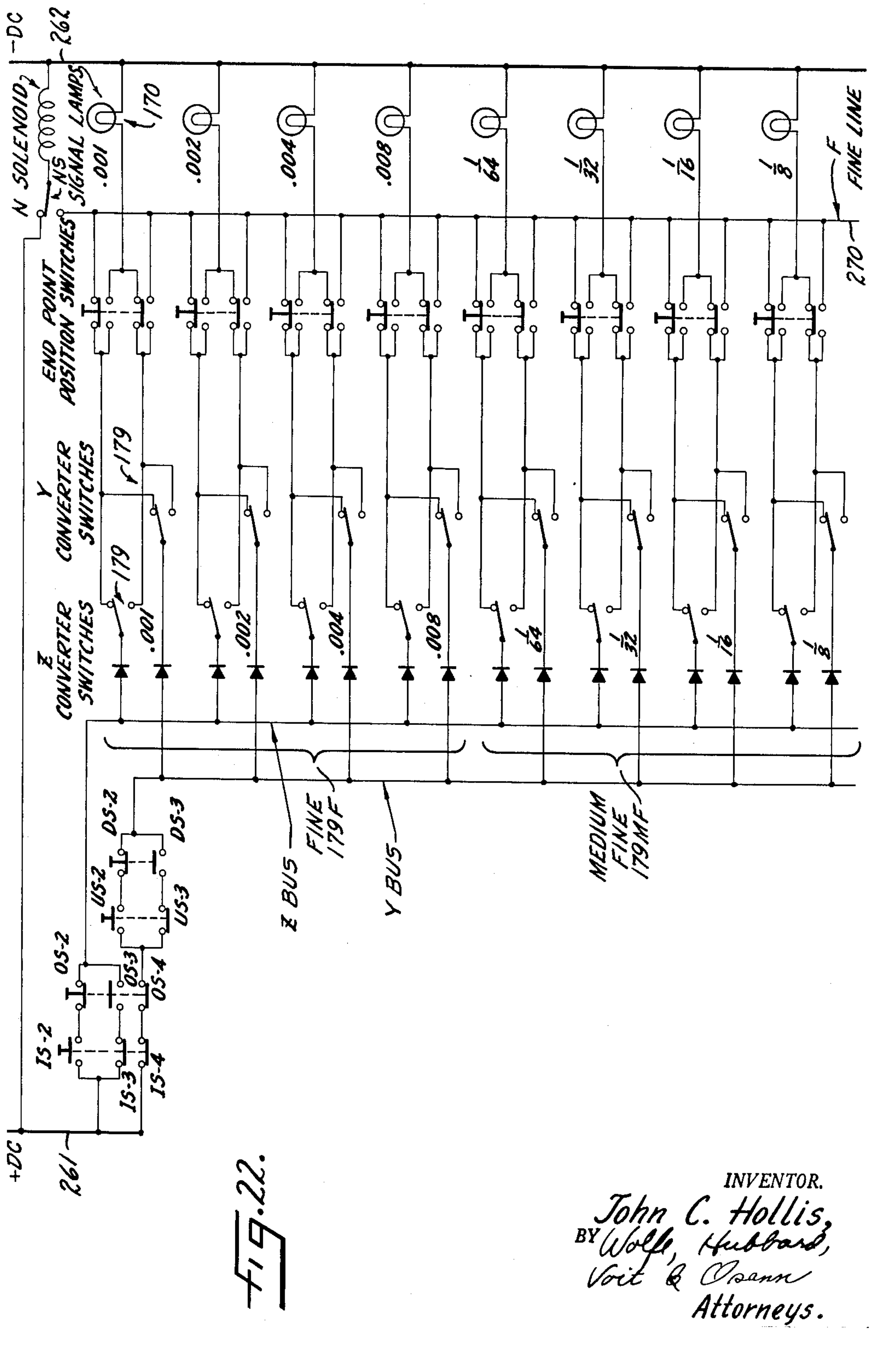
Figure 23:
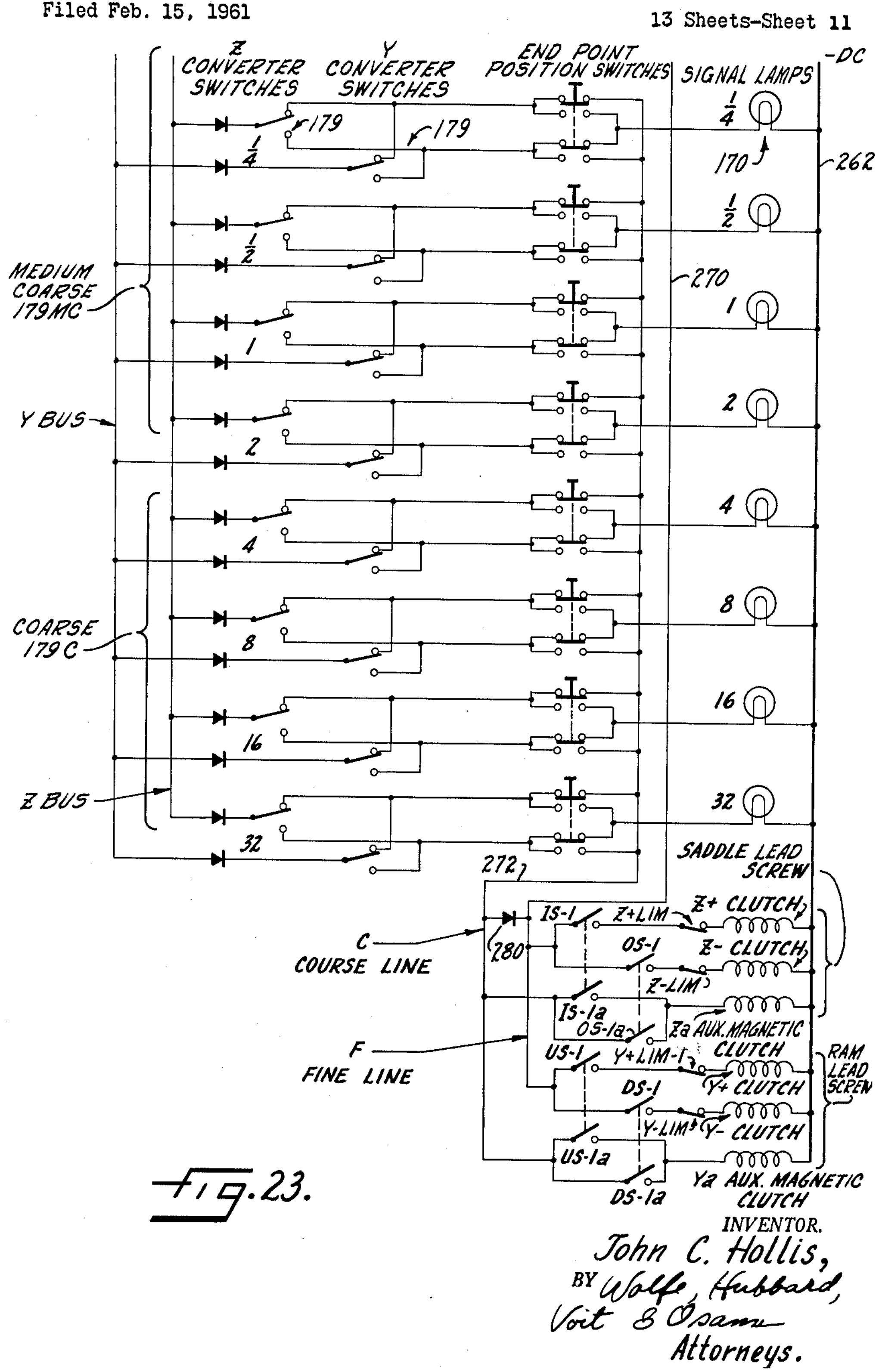

FIG. 6 diagrammatically shows an analog digital converter transmission;

FIG. 7 is a longitudinal sectional view of the analog to digital converter;

FIG. 8 is a fragmentary longitudinal sectional view of the converter with certain parts removed;

FIG. 9 is a transverse sectional view taken substantially in the plane of lines 9-9 of FIG. 7 through the fingers to show the auxiliary slowdown switches;

FIG. 10 is a transverse sectional view taken substantially in the plane of lines 10—10 of FIG. 7 through the ring gear of the fine section;

FIG. 11 is a transverse sectional view taken substantially in the plane of lines 11—11 of FIG. 7 adjacent the first cam and the fine section;

FIG. 12 is a fragmentary transverse sectional view taken substantially in the plane of lines 12—12 of FIG. 7 adjacent the fourth cam in the medium fine section;

FIG. 13 is a fragmentary elevational view of parts in section taken substantially in the plane of lines 13—13 of FIG. 11 looking down on the third switch of the fine section;

FIG. 14 is a perspective view of the stack of converter cams of the converter coarse section;

FIGS. 15–18 diagrammatically illustrates the four sets of cams comprising a converter cam stack;

FIG. 19 is a chart depicting in binary notational form the successive states of the converter switches;

FIG. 20 is a fragmentary sectional view taken substantially in the same plane as FIG. 11 and showing all fingers reflected outwardly by the converter rods;

FIGS. 21, 22 and 23, when joined together in edge-to-edge relation, comprise a schematic wiring diagram of the control system;

FIGS. 24–28 diagrammatically illustrate successive steps of a machining process;

FIG. 29 is a chart giving data for the machining steps of FIGS. 24–28; and

FIG. 30 is a chart illustrating converter slowdown switches actuation.

While the invention has been shown and will be described in some detail with reference to a particular embodiment thereof, there is no intention that it thus be limited to such detail. On the contrary, it is intended here to cover all alternatives, modifications and equivalents falling within the spirit and scope of the invention as defined by the appended claims.

GENERAL ORGANIZATION

In order that the invention and its advantages may be fully understood, the background setting or environment for one specific application of the invention will first be briefly considered, particularly with reference to an exemplary machine tool. It will be understood, however, that the invention may be applied in a straightforward manner in other specific environmental settings and with types of machine tools other than the one here shown.

The machine tool here shown by way of example is a vertical turret lathe 20 (FIGURE 1) which, in general terms, includes a rotatable member or table 21 journaled for rotation about a vertical axis in a base 22 and adapted by means such as chuck jaws 23 to rigidly support a workpiece (not shown). Rising above the table 21 are columns 24 connected at their upper ends by a crosspiece 25 and supporting a vertically adjustable crossrail 26. The rail is formed with way surfaces 28 which slidably support a translatable element or saddle 30 for movement in a horizontal direction. The saddle, in turn, slidably supports a vertically movable ram 31 which carried an angularly positionable turret 32 adapted to carry a plurality of cutter tools selectively positionable in the downwardly extending working position. As here shown, a tool holder 34, carried by the turret 32, is adapted to receive a cutter which can machine the workpiece on the rotating table 21 to different diameters and accomplish facing cuts along surfaces disposed radially of the table axis.

The ram 31 is vertically positionable within the saddle by rotation of a lead screw 35, while the saddle 30 is horizontally positionable in response to rotation of an associated lead screw 36. The lead screw 36 is adapted to be driven in either direction and at any of a plurality of angular velocities in order to impart different feed rates or linear velocities to the saddle 30. For this purpose, a multi-speed feed transmission is disposed with a housing 38. Appropriate position indicators are disposed on the machine tool. A scale 40 which rotates in proportion to vertical movement of the corresponding tool holder and thus indicates its position, and a second scale and dial 41 which rotates in proportion to the horizontal movement of the corresponding tool holder and thus indicates its horizontal position.

For further details regarding the organization and operation of the turret lathe 20, reference may be had to Hollis Patent No. 2,831,361, issued April 22, 1958; and to the copending continuation-in-part application of John C. Hollis, Serial No. 54,811, now Patent No. 3,027,782, filed August 31, 1960, and assigned to the assignee of the present application. For further details of a suitable power turret, reference may be made to Conover Patent No. 2,936,656. While the features of the present invention may be applied to the control of motions and positions of several other movable elements such as the side head 42, they will, for brevity, be described here only in relation to the feeding and positioning of the saddle 30 and the ram 31 in coordination with rotation of the table 21. Moreover, this description will be confined to the details of the means for positioning the ram or saddle under power, for further details of the mechanism for power setting, reference may be made to the above-mentioned Hollis patent.

*Table speed transmission*

The rotatable member or table 21 (FIGURE 1) is adapted to be driven at any one of a plurality of rotation speeds. In order to understand how this is accomplished by electrical controls, a multi-speed table transmission having a plurality of electromagnetically operated clutches is illustrated in FIG. 2. As there shown, a prime mover or electric motor 43 has its output shaft 44 drivingly connected to a shaft 45 with either of two drive ratios in response to selective energization of speed clutch coils SC–1 or SC–1*a*. With neither coil energized, the transmission is in neutral as shown in FIG. 2. Energization of either coil SC–1 or SC–1*a* shifts an armature 46 or 46*a* and causes driving engagement of a clutch member 47 splined to the shaft 45 with either of two gears 48 or 49 journaled on that shaft. The gears 48 and 49 are respectively meshed with gears 50 and 51 fast on the motor shaft 44 so that the shaft 45 will be driven from the motor shaft 44 at either of two speeds depending upon whether the clutch coils SC–1 or SC–1*a* are energized. With both coils deenergized, springs 52, 52*a* hold the clutch member 47 in a neutral position free from engagement with either gear 48, 49.

In a similar manner, a clutch assembly controlled by a clutch coil SC–2 is interposed between the shaft 45 and a third shaft 53, so that the latter may be driven at any of four speeds depending upon the particular combination of the clutch coils SC–1, SC-1*a*, SC–2 which are energized. Thus the shaft 45 is drivingly connected to the third shaft 53 at either of two drive ratios in response to energization or deenergization of the speed clutch coil SC–2. Energization of that coil shifts an armature 54 against the bias of a spring 55 and causes driving engagement of a clutch member 56 splined to the shaft 53 with a gear 58 journaled on that shaft. When the clutch coil SC–2 is deenergized, the spring 55 holds the clutch member 56 in driving engagement with a second gear 57 journaled on the shaft 53. The gears 57, 58 are drivingly engaged by gears 60, 61 fixed on the shaft 45. Further, the shaft 53 carries gears 62, 63 which are in driving relation with a shaft 64 through a similar clutch assembly 65 controlled by a clutch coil SC–3. Finally, the shaft 64 is drivingly connected to an output shaft 67 through a clutch assembly 68 controlled by an associated clutch coil SC–4 so that for each speed of the shaft 64 the output shaft 67 may be driven at either of two speeds, depending upon whether the clutch coil SC–4 is energized or deenergized. The output shaft 67 carries a pinion 69 meshing with a beveled ring gear 70 rigid with the table 21.

A normally disengaged brake 71 is associated with the table to stop the table by engaging the brake with the table drive in neutral. The brake 71 is operated by energizing the brake coil BR.

It will be apparent that depending upon the particular one of sixteen (plus a neutral) possible combinations of the five clutch coils SC–1, SC–1*a*, SC–2, SC–3, SC–4 which are energized, the table may be driven at any one of sixteen possible rotational speeds ranging, illustratively, from 24 to 320 revolutions per minute.

The multi-speed trnasmission of FIG. 2 is only diagrammatically illustrated, and a more detailed preferred organization is shown and described in the above-identified Hollis application.

*Saddle feed and ram feed transmission*

The multi-speed feed transmission for translating the saddle 30 in or out in the Z direction, and the ram 31 up or down in the Y direction and at any of a plurality of relative feed rates may be of the type disclosed in the above-identified Hollis patent. To facilitate an understanding of the present invention, such feed transmission is diagrammatically illustrated in FIG. 2, having an input member in the form of a gear 72 which is meshed with and driven by the beveled ring gear 70 fixed to the table 21. Therefore, the input to the saddle and ram feed transmission is always at a speed which is related to the table speed. Drivingly connected between the input shaft 74 and a drive shaft 76, which is adapted to be coupled to drive either the saddle lead screw 36 or the ram lead screw 35 or to drive both the saddle lead screw 36 and the ram lead screw 35 simultaneously, are four two-speed gearing and clutching assemblies 82, 83, 84, 85, respectively, controlled by five feed clutch coils FC1–S, FC1–F, FC2, FC3, FC4. The gearing and clutching assemblies are here shown as identical to such assemblies of the table transmission also shown in FIG. 2, and therefore need not be described in detail. It is sufficient to note only that, for a given speed of the input shaft 74 (i.e., a given speed of the table 21), the final shaft 76 may be driven at any of sixteen possible speeds or rates depending upon the particular combination of the five clutch coils FC1–F, FC1-S and FC2–FC4 which are energized.

In order to control starting and stopping of the saddle 30, and the direction of its movement, the shaft 76 is drivingly connected through two normally disengaged forward and reverse clutches 86, 88 to the saddle lead screw 36 which is threadably engaged with a nut 30*a* connected to the saddle. Energization of the forward clutch coil Z+ shifts a clutch member 88 splined to the lead screw 36 into engagement with the teeth 88*a* of a gear 88*b* journaled on that screw and coupled through an idler gear 89 to a gear 76*b* fixed to the shaft 76. This will drive the saddle lead screw 36 in a forward direction, i.e., in from right to left in FIG. 2. Alternatively, energization of a clutch coil Z— will shift a clutching member 86 splined to the lead screw 36 into engagement with the teeth 86*a* of a gear 86*b* journaled on that screw and meshed with a gear 76*a* rigid with the shaft 76. This will cause the lead screw 36 to rotate in such a direction as to move the saddle 30 out, i.e., from left to right. When neither of the clutch coils Z+ or Z— is energized, then the saddle 30 will be stopped, even though the table is rotating.

Likewise, in order to control starting and stopping of the ram 31, and the direction of its movement, the shaft 76 is drivingly connected through two normally disengaged forward and reverse clutches 93, 92 to the lead screw 35 which is threadably engaged with a nut 31*a* connected to the ram. The forward and reverse clutches for the ram lead screw 35 operate in a manner similar to the operation of the forward and reverse clutches for the saddle lead screw 36. In this case, however, the Y+ clutch coil engages the clutch member 93 with the teeth 93a of a gear 93b fixed on a shaft 95 connected through beveled gearing 96 to the ram lead screw 35 to rotate the same to raise the ram in the Y+ direction. Similarly, energization of the Y− clutch coil engages clutch member 92 with the teeth 92a of a gear 92b fixed on the shaft 95 for operating the ram screw 35 in a direction to lower the ram in a Y− direction. The gears 92b, 93b are in driving relation with the shaft 76.

Another feature of the feed transmission is the provision of a rapid traverse motor and clutches to connect this traverse motor to the saddle and ram. In the present case, also shown in FIG. 2, the traverse motor is connected through a clutch 101 to the shaft 76. Energization of a T clutch coil shifts a clutch member 101a splined to the shaft 76 into engagement with a gear 101b operated by the traverse motor through a gear 101c. This will drive the shaft 76 at a fast speed for rapid traverse of the saddle or ram. One of the feed clutches 82 in the feed transmission is constructed so that with neither of the actuating FC1–F or FC1–S clutch coils energized, the clutch 82 is in neutral thereby disengaging the feed transmission. Suitable interlocks and controls are provided, as will be described hereinafter, to insure that this feed clutch 82 is disengaged and in neutral when the traverse motor is connected in drive relation to operate the shaft 76.

Illustratively, feed rates of between .0007 inch per revolution of the table to .144 inch per revolution of the table may be provided with the feed transmission shown, with particular combination of the five feed clutch coils FC1–F, FC1–S and FC2–FC4 actuated. It will be noted that the feed rates are expressed in "Inches Per Table Revolution" in view of the fact that the speed of the input gear 72 depends on the speed of the table 21. The absolute feed rate or velocity in "Inches Per Minute" at which the saddle 30 or ram 31 moves depends upon both the setting of the speed transmission and the setting of the feed transmission.

MACHINE TOOL CONTROL

Figure 1:
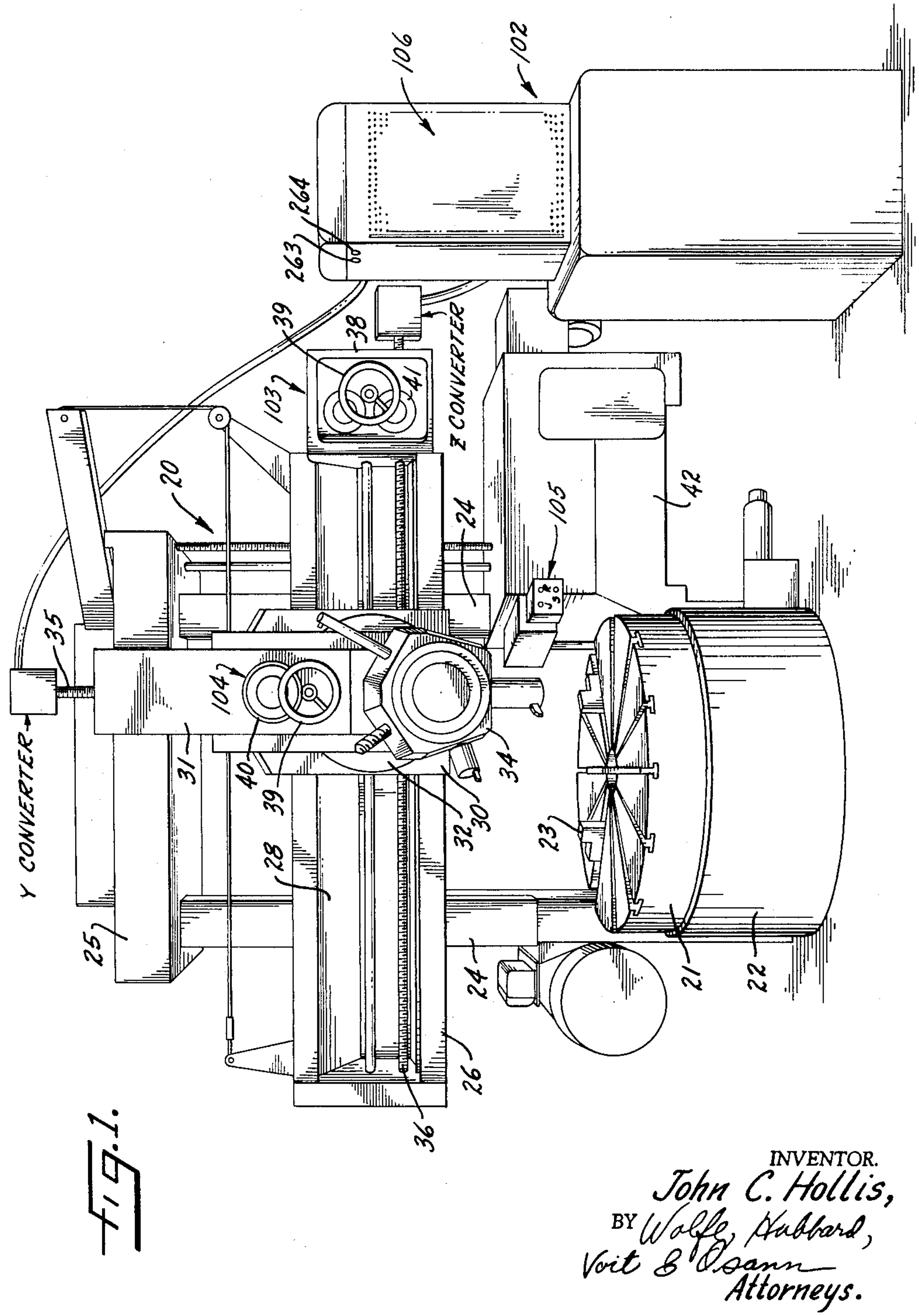
Figure 2:
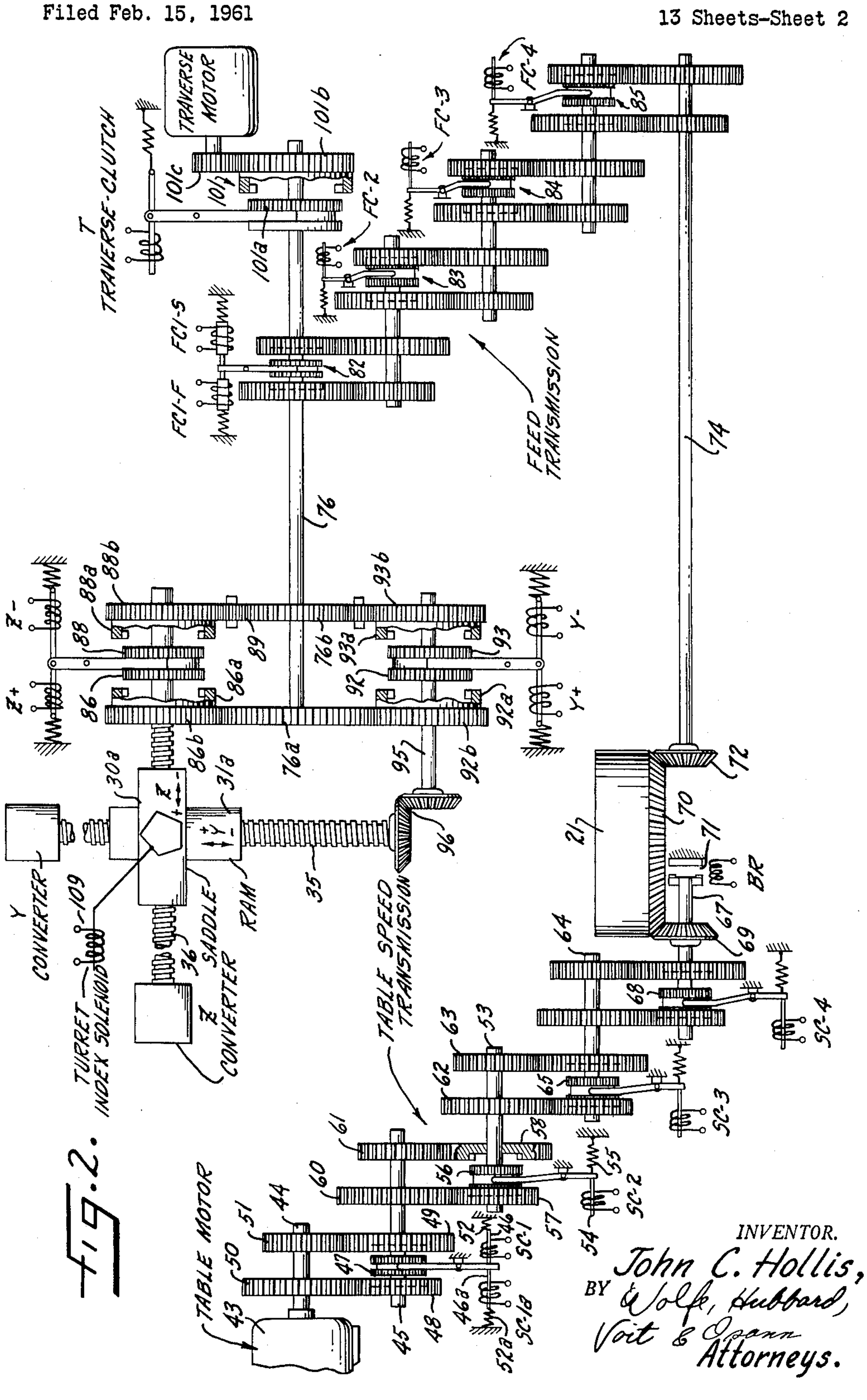

Referring to FIGURE 1, a control console 102 is illustrated on the right-hand side of the machine tool shown in this figure. A table speed control panel 105 at the machine tool is further provided which has the controls for operating the table transmission in the form of RUN, STOP and JOG buttons.

Figure 3:
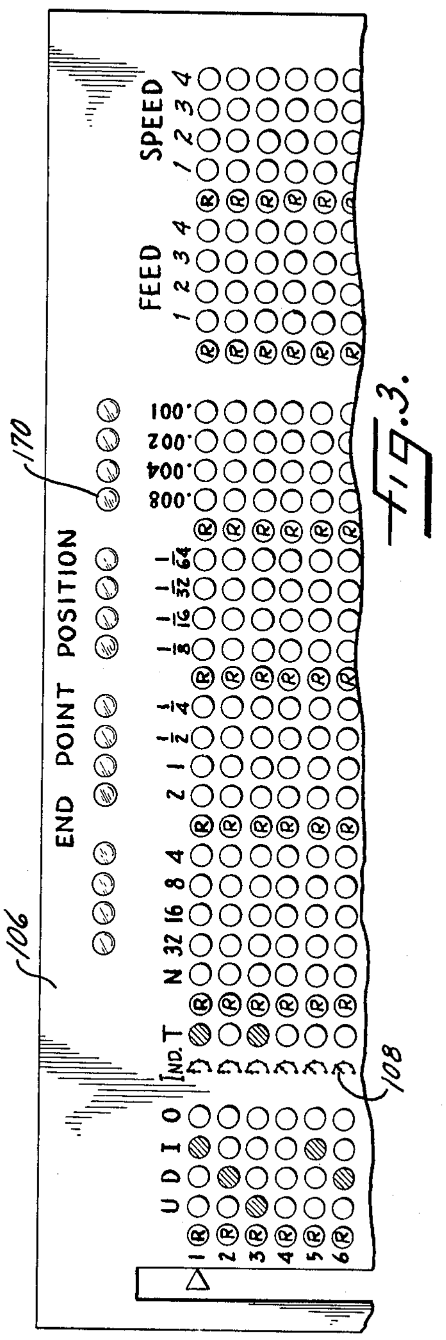
FIG. 3 illustrates a fragment of the tool control panel.

The control console 102 provides mean operative through the control system to select the saddle or ram for operation and direction of movement and to select the feeds and speeds of the saddle, ram and table. Such means includes a pushbutton keyboard or control panel 106 on the front of the console for actuating control system switches, herein shown in microswitches mounted on a movable panel carriage 107 supported behind the face of the panel. A fragment of the console pushbutton keyboard is illustrated in FIG. 3, and the panel face is broken away in FIG. 4 to show the carriage 107. Referring to these figures, at the left side of the panel 106 there are found vertical rows of UP-DOWN-IN and OUT pushbuttons U, D, I and O for actuating control system switches IS, OS operative to energize the Z+ or Z− clutch coils for coupling the feed transmission to the saddle lead screw 36 thereby to operate the saddle, and for actuating control system switches US, DS to energize the Y+ or Y− clutch coils for coupling the feed transmission to the ram lead screw 35 thereby to operate the ram. Such switches are found in the control system schematic wiring diagram of FIGS. 21–23 to which references may also be made. Compound motion of the cutting tool at 45° relative to the Z and Y axes is provided by moving both the saddle and ram; the invention will be applied in simplified form to a two-dimensional system, although it will be readily understood the invention may be further applied in a straightforward manner to further operation of the cutting tool in the X direction where required in connection with a particular machine tool.

Controls for power indexing the turret are included in the form of a vertical row of rotatable switch actuators IND for indexing the turret to any one of five turret positions for each machining step.

At the right-hand side of the panel 106 is found vertical rows of pushbuttons under the legends FEED and SPEED for selecting feed rates for the saddle and ram, and for selecting table speeds. By operating combinations of the Feed select pushbuttons F1–4 in one line with the carriage 107 behind that line the feed select switches FS1–4 carried by the carriage are actuated to energize combinations of the feed clutch coils FC1–S, FC1–F and FC2–FC4 and thereby obtain any one of sixteen feed rates for the saddle and ram. Similarly, by operating combinations of the Speed select pushbuttons S1–4 in the same line, the speed select switches SS1–4 are actuated to energize speed clutch coils SC1a and SC1–SC4 and thereby obtain a desired table speed.

*Saddle and ram operation*

Turning first to the pushbutton actuated controls for the saddle and ram, as hereinbefore mentioned, the left side of the panel carries UP-DOWN-IN and OUT pushbuttons U, D, I and O for operating the Z+ and Z− clutches for the saddle or the Y+ and Y− clutches for the ram. These pushbuttoms are arranged in vertical rows; the first row R at the left is for resetting; the second and third rows are associated with the ram 31 to permit selection of either up or down movement of the ram. The fourth and fifth rows are associated with the saddle 30 to permit selection of either in or out movement of the saddle.

The sixth vertical row of buttons is for indexing the turret to any one of five positions. The seventh row, T, permits selection of the fast traverse speed for the ram or saddle. Only the pushbuttons in a single horizontal line are effective together to control a single machining step.

It will readily be understood, therefore, that a cutting tool in the turret of the machine tool may be moved up or down in a manually controlled machining step, by punching the UP or DOWN button U, D, in one of the pushbutton lines at the control panel. In a similar manner, in or out movement or movement at 45° may be obtained by punching the IN or OUT button, I, O or combinations of the UP-DOWN-IN or OUT buttons, respectively. To stop the saddle or ram, the left hand reset button R for that line is punched in to release the UP-DOWN-IN or OUT button. End point selection, it will be observed, in a manually directed machining step is achieved under the direct guidance of the machinist by his stopping the cutting tool and measuring the workpiece or otherwise checking the piece to determine whether the machining step has been completed properly. Setting in data for carrying out this step in the repeat cycle requires that a certain combination of UP-DOWN-IN and OUT buttons be restored, whichever produce the desired direction of movement.

*Turret indexing*

Adjacent and to the right of the rows of UP-DOWN-IN and OUT pushbuttons is found the vertical row of rotary actuators IND for selecting turret positions. Details of a suitable power turret may be found in Conover Patent No. 2,936,656. Means for operating the turret motor is incorporated in the control system (FIGS. 21–23), and comprises a simplification or straightforward modification of the control means described in detail in said Conover patent to position the turret by power responsive to the angular setting of the rotary actuators IND. Such simplified means is herein shown as selector switches with contacts INS1–5 which are carried by the panel carriage 107 at a point behind the vertical row of actuators IND so that means such as a wiper arm 108 mounted on each actuator IND and angularly positionable at one of five positions corresponding to turret index positions, bridges between contacts zero and one of the numbered switch contacts INS1–5. These selector switch contacts are energized only with the ram at its uppermost position to avoid the danger of a rotating tool striking the work; a second set of normally open limit switch contacts Y+lim–2 are provided to make it impossible to index the turret unless the ram is at its uppermost position whereby such contacts are closed.

While in the control means illustrated in said Conover patent means is also provided to select direction in which the turret will be indexed, it will be readily understood that this latter means may be set permanently in either position as desired so that the turret will always be rotated in one direction to the selected position for a particular machining step.

The limit switches LS1–5 (FIG. 21) in series with each of the selector switch contacts INS1–5 are associated, respectively, with the five turrent positions so that one of such switches is actuated to open the contacts thereof for each turret position. Illustratively, the turret is at position one thereby opening the first limit switch LS1. To index the turret from this position to any other of the five positions, the operator manually sets the rotary actuator IND in one line of the pushbutton keyboard to an angular position corresponding to the desired turret position. This bridges the selector switch contacts zero to the same numbered contact as the desired turret position. When the limit switch for the ram is actuated to close its second set of contacts Y+lim–2 energizing the turret selector switch INS, a circuit will be completed through the same numbered contact as the desired turret position and the same numbered normally closed limit switch LS1–5 thereby energizing the turret indexing solenoid 109 and starting the turret motor. This rotates the turret body. Such rotation will continue uninterruptedly without pause until the limit switch which is in circuit with the energized selector switch contact INS1–5, is operated. Upon operation of this limit switch, the contacts of the limit switch will open to deenergize the turret motor solenoid 109. When this solenoid is deenergized, its contacts 109–1 will drop out thereby stopping the turret motor.

Modifications or simplifications of this turret control to accommodate the present control system, are contemplated. For example, the usual step-by-step turret indexing means may be incorporated and arranged to be responsive to an indexing pushbutton instead of a rotary actuator IN. With such an arrangement, an indexing solenoid will be energized when the indexing pushbutton of a line on the panel is latched in thereby causing the turret to advance one step. Other modifications or simplifications will be readily apparent, as, use of a conventional sequencing mechanism cam powered by the last bit of Y-axis motion.

*Feed and speed selection*

Turning next to the feed and speed controls, at the right side of the panel 106 are two sets of pushbuttons entitled Feed and Speed, respectively, with separate reset buttons R for each set. In this case the pushbuttons of the Feed set are associated respectively with the feed clutch coils FC1–F, FC1–S and FC2–FC4 (FIG. 2) and the pushbuttons of the Speed set are associated respectively with the speed clutch coils SC1*a* and SC1–SC4, to permit selection by combinations of the pushbuttons, of any one of sixteen table speeds and any one of sixteen feed rates for the saddle or ram.

By means of pushbuttons at the left of the panel, the ram and thereby a cutting tool in the turret may be moved up or down by punching the UP or DOWN button U or D in one line behind which the carriage 107 is positioned, or may be moved in or out by punching the IN or OUT button I, O in the same line. The cutting tool may also be moved at 45° in the two-dimensional control system here illustrated by punching one of each of the UP-DOWN or IN-OUT buttons. The table speed during such operation, and the feed rate at which the saddle or ram will travel is set by the Feed select pushbuttons and Speed select pushbuttons on the same line. Each horizontal line of pushbuttons, therefore, provides means for controlling the machine tool elements so that a cutting tool may be operated at any feed rate with any table speed available using the transmission with which the machine tool is equipped.

*End point position selection*

The block of pushbuttons in the center of the panel 106, hereinafter referred to as the End Point Position block, starting at the left with R and N and ending with .001 provides means operative through the control system for end point selection. Such means is used for carrying out a machining step automatically in the repeat or mimic cycle. One of the major features of this invention is that such means may be utilized to record the end point reached by the cutting tool during a machining step carried out under the manual direction of the machinist so as to serve as the address for the cutting tool in that same machining step repeated automatically.

To achieve this result, each horizontal line of buttons in the End Point Position block serves as means operative through the control system to provide a signal in binary digital form representing the end point address for the cutting tool in an individual machining step. Such end point is measured along the Z or Y axis with relation to a reference position R wherein the saddle is at the right-hand side of the machine tool, as viewed in FIGURE 1, and the ram is raised. The End Point Position block to this end includes four groups of buttons for recording or selecting cutting tool end point positions with graduated degrees of accuracy.

Each End Point Position pushbutton actuates bistable means in the control circuit, herein shown in FIGURES 22 and 23 as a four pole double throw switch carried by the carriage 107. The state of one set of each switch contacts represents one binary digital code place of an end point address along the Z axis while the other set of contacts represents the same binary digital code place of an end point address along the Y axis.

By means of the control system described in a later section in more detail, in the automatic repeat cycle, with combinations of the pushbuttons in one line of the End Point Position block punched in or latched in by the keyboard mechanism, the cutting tool may be stopped to complete a machining step at any end point with 64 inches measured along the Y or Z axis from the reference point R within an accuracy of about .001 inch, although this is exemplary only and may be modified, by adding or subtracting pushbuttons and associated control system components, to suit the particular machine tool with which the control happens to be associated. Furthermore, the panel shown in FIGURE 1 provides means for control of as many individual machining steps as there are lines of pushbuttons with all of the information as to a single machining step contained in a single horizontal line.

*Pushbutton keyboard mechanism*

In carrying out the mimic feature of the invention, each machining step of a program making up a machining process may be carried out under manual direction and the information as to each such step required to carry out the same step later in a repetitive manner may be punched into the pushbutton keyboard of the control console 102 which serves as a memory device to record the machining data and also as a means, in conjunction with the control system, for directing the machine tool in the repeat cycle to automatically machine a new workpiece. For this purpose the control console 102 includes mechanism by means of which the information as to a single machining step will be retained in the form of latched-in selected pushbuttons of a line on the panel, to be utilized to direct the operation of the machine tool to repeat the machining step.

Figure 4:
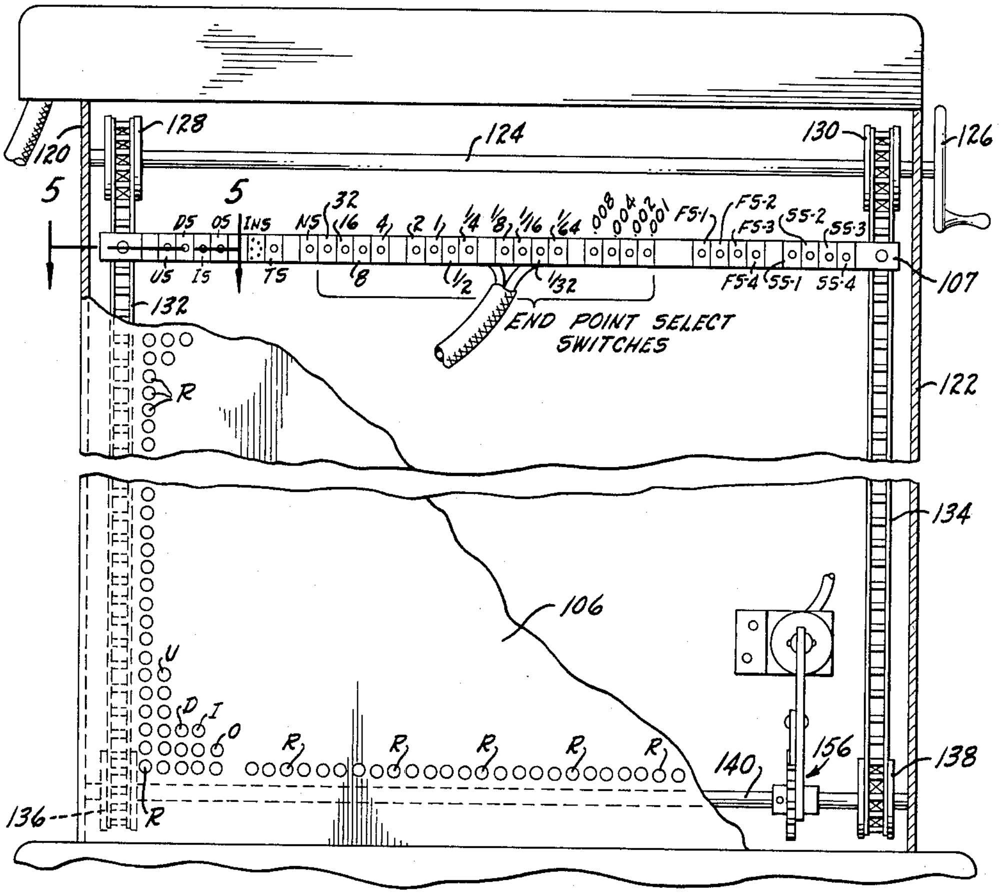
FIG. 4 and 5 illustrate the control panel mechanism.
Figure 5:
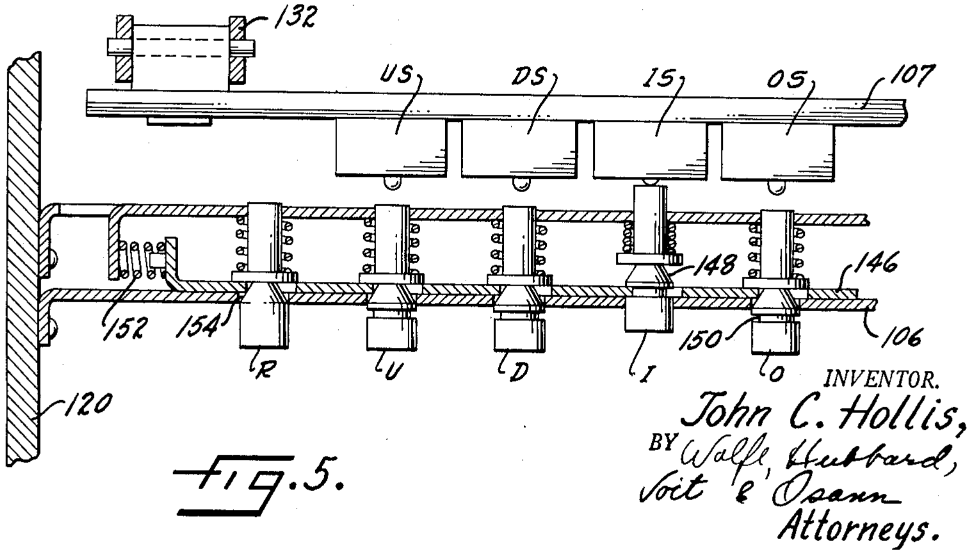

Now referring to FIG. 4, the face of the panel 106 is broken away to show what lies behind the pushbuttons. Behind the top of the panel between side frame members 120, 122 there is mounted a shaft 124 having a handle 126 at one end for manual operation and carrying a pair of sprockets 128, 130 driving, by means of chains 132, 134, sprockets 136, 138 on a similar shaft 140 behind the bottom of the panel. Connected between the chains by fastening means to an individual link of each chain so as to be movable up and down by turning the shafts and chains, is the panel horizontal carriage 107 which supports a series of switches, herein shown as snap-acting microswitches, aligned respectively with the vertical rows of pushbuttons. The arrangement is such that a microswitch will be closed when an aligned pushbutton is punched in or when a pushbutton is in the latched-in position when the carriage is brought behind that pushbutton line. Thus the left-hand switch US is located behind the U vertical row of pushbuttons (FIG. 3), the second switch DS is behind the D vertical row of pushbuttons, and so on. Referring also to FIG. 5, the group of four switches at the left side of the carriage 107 are behind the rows of pushbuttons U, D, I and O (there is no switch behind the reset buttons) so as to be selectively actuated when selected pushbuttons of this group are punched in.

As shown in FIG. 5, means are further provided to latch the buttons of the panel 106 when punched in, herein shown as horizontally slidable latch plates 146 behind each set of buttons. Each plate 146 is spring-biased toward the right such that when any button is punched in, the tapered neck thereof 148 cams one latch plate 146 to the left to allow the button to move to its in position with the peripheral slot 150 in the button in the plane of the plate 146. The plate 146 is automatically pushed by the spring 152 into the slot in the button to hold the button in. A reset button R is provided with each set of buttons to release or cancel one or more depressed buttons of a set and has a similar tapered neck 154 to shift the latch plate 146 toward the left thereby releasing such pushbuttons. It will be readily seen that considering a horizontal line of buttons, with the carriage 107 behind that line, selected ones of such buttons may be punched in manually thereby closing the contacts of the corresponding microswitches on the carriage 107 and establishing all the requisite information for the machine tool to carry out a machining step, and such buttons will be latched in to hold the information.

The panel carriage 107 is movable vertically, in the present case, so as to be positionable at the level of each horizontal line of pushbuttons. The carriage may be moved manually by means of the handle 126, to position the carriage as desired. Means are also provided to move the carriage automatically. With automatic carriage movement, succeeding machining operations, the information for which has been earlier punched in, may be repeated as the carriage moves down behind the panel face from line to line of the pushbuttons. In the repeat cycle, as the carriage moves from behind the pushbuttons at one level to the pushbuttons at the next lower level, the switches on the carriage are deactuated and then reactuated according to the buttons punched in in the new rank.

To shift the carriage 107 to carry out succeeding machining steps completely automatically, the control system includes an N (next) solenoid which, in one stroke of the solenoid through a ratchet mechanism 156 (FIG. 4), turns the lower shaft 140 sufficiently to step the carriage from one line to the next lower line of panel pushbuttons. Each line of pushbuttons in the control panel End Point Position block also includes a button N which, through a microswitch on the carriage 107 operates the N solenoid. The button N of any line when latched in designates that the next machining step will be carried out immediately following the completion of the step for which the data is stored in that line. To this end, the pushbutton N is effective to deenergize the N solenoid at the completion of a machining step, thereby to step the panel carriage to the next lower line of pushbuttons reserved for the succeeding machining step fully automatically. In the usual repeat cycle for a plurality of machining steps, such as the twenty steps shown diagrammatically in FIGS. 24–28, after each machining step is completed the carriage is automatically stepped by the N solenoid and ratchet mechanism 156 from one to another line of pushbuttons. After the machining step established by the depressed pushbuttons of the first line is completed, for example, the carriage is shifted to the second line; after the machining step for which the data is stored in that line is completed, the carriage is shifted to the third line; and so on.

*End point position Signal Lamps*

Another feature of the invention, the importance of which will appear as this description proceeds, relates to provision on the control panel for visually indicating the instantaneous position of the cutting tool. Referring to FIG. 3, this is achieved, in general, by operating a set of signal lamps 170, one over each vertical pushbutton row in the End Point Position panel block, from means associated with the saddle lead screw 36 and ram lead screw 35. Thus, illustratively, as the saddle lead screw 36 rotates to advance the saddle 30 toward a workpiece on the table, or the ram lead screw rotates to advance the ram 31, the signal lamps over the End Point Position block flash on and off to give visual indication of the instantaneous position of the cutting tool. It will be readily understood that the condition of the lamps at any given instant provides positional information in binary form according to whether each signal lamp is on or off. The signal lamps are similarly actuated when both the ram and saddle are advanced to move the cutting tool at 45° to the Z axis; however, the master axis in the present case is the Z axis so that the Z coordinate of the instantaneous position of the cutting tool (designating the saddle position) is represented in binary by the condition of the signal lamps at any particular instant when both the saddle and ram are operating to position the cutting tool.

ANALOG TO DIGITAL CONVERTERS

For cooperation with the End Point Position selection means, which provides a signal in binary digital form, or code, representing selected end point, according to the present invention an improved means is included for representing in like binary digital form, or code, the instantaneous position of the saddle and ram for comparison with the end point signal, to the end that the cutting tool will be guided by such comparison automatically to the selected end point. Such improved means for indicating the instantaneous position of each of the saddle and ram, herein shown as an analog to digital converter mounted for operation by each lead screw, is also used to actuate the End Point Position signal lamps 170.

Referring to FIG. 1, the converter on the ram lead screw 35 is referred to hereinafter as the Y converter, while the converter on the saddle lead screw 36 is referred to hereinafter as the Z converter. Such converters, in the present case, provide sets of electrical impulses representative, in consecutively higher binary digital code places, of the instantaneous angular disposition of the associated lead screw, thereby providing positional information as to the cutting tool. Since the Y and Z converters are similarly constructed, the following description will be confined for the most part to the Z converter; however, it is to be understood that this description applies to either unit. Moreover, it is to be understood that while the preferred converter units herein described are suited particularly to a machine tool such as the vertical turret lathe shown in FIGURE 1, the principles of this aspect of the invention may be applied in a straightforward manner to analog to digital converters suitable for other applications or for use in connection with other machine tools, where the particular dimensional requirements are different.

Constructed for use in connection with the particular machine tool shown in FIGURE 1, accordingly, each converter (FIG. 6) includes four sections corresponding, respectively, with the four groups of pushbuttons in the End Point Position block of the panel, and identified as the Fine, Medium Fine, Medium Coarse and Coarse sections. Each section includes a stack of cams 175 driven from one lead screw at a preselected speed ratio through a transmission section 177. Such stacks of cams are associated, respectively, with sets of converter switches 179. The stacks of converter cams 175, through the sets of converter switches 179, produce lead screws positional data of graduated accuracy.

In carrying out this invention, to provide positional data in usable form and representing saddle travel within the requisite degree of accuracy, with a saddle lead screw having a ½ inch pitch the cam stack 175MF for the Medium Fine switches is driven directly by the saddle lead screw. The cam stack for the Fine switches is driven faster than the lead screw through an up drive having a 16:1 ratio, while the cam stacks 175MC and 175C for the Medium Coarse and Coarse switches are driven slower than the lead screw through step-down drives providing 16:1 reduction and 256:1 reduction, respectively. With such converter transmission drive ratios and converter cams constructed as described in detail later, the states of the switches 179 starting with the Fine set 179F and ending with the Coarse set 179C, represent consecutively higher places of the binary digital code. Each switch 179 is actuated by one cam 175 so as to represent the digit of one binary place in said code. With this arrangement wherein converter switches are directly actuated, it has been found that commercial microswitches, such as GE Switchette, series 103, are suitable; the switches selected for such purposes should, of course, be rated for the relatively heavy currents of clutch and brake circuits in which as will be described in more detail later, the converter switches 179 are connected.

*Converter cams*

As shown diagrammatically in FIGS. 15–18, each converter section includes a stack of four cams, herein shown as annular arrays of rollers 180. Each annular set of rollers contacts cam followers in the form of spring fingers 182 causing the latter to actuate the converter switches illustrated as microswitches 179 with buttons 184 engaging the spring fingers (FIG. 12). It should be noted, however, that in the case of the Medium Coarse and Coarse sections, short fingers 182 are used as shown in FIGS. 15–18, while in the Fine section long fingers are used as appear, for example in FIG. 13.

The rollers 180 in each cam stack 175 are arranged similarly. For supporting the rollers 180, each stack includes five axially spaced annular discs (FIG. 14) 186A–E carrying rollers 180 in circular array around the periphery. Taking the Fine switches cam stack as illustrative, four switches 179–1–4 are provided staggered at 90° about the cam stack to accommodate space limitations. Associated respectively with the four sets of rollers 180, the first switch 179–1, which is the top switch in FIG. 11, represents by a single change of state between off and on position, the smallest increment of saddle movement registered in the illustrative converter: that is, approximately .001 inch of saddle movement. To achieve this result, such first switch 179–1 is actuated by the first annular set of rollers at the left-hand end of the cam stack as viewed in FIGS. 6, 7 and 14, which set includes sixteen rollers 180 equally spaced around the periphery, as shown in FIG. 15. Still referring to FIG. 14, such rollers may be ordinary roller or ball bearings mounted on pins 188 supported by the cam discs so as to provide friction-free contact with the finger followers 182 spring biased toward the rollers. Square spacers 190 are provided to hold the cam discs 186A–E separated sufficiently to allow the rollers to turn freely and the cam discs are held in assembly by pins 192 passing through the corners of the spacers.

To obtain the requisite oscillating action of the finger followers 182 wherein the finger 182-1 of the first cam is operated to actuate the microswitch as each roller passes, a crimp is provided in the finger providing an offset portion 193 narrow enough to enter between adjacent rollers as the cam rotates, and extending far enough so that as the crimped portion rides over the high point of a roller, the back of the finger actuates the first microswitch. In FIG. 13 the complete details of each follower are shown. Each follower includes a wide section rotatably supported on a rod 194 and extending the full length of the cam stack. A narrow section providing the finger contacting the rollers extends therefrom at a point located axially in alignment with the particular cam with which the follower is associated. As noted before, the length of the finger depends on the converter switches with which the finger happens to be associated. The long finger 182–3 is shown in solid lines in FIG. 13 for the third converter switch 179–3 of either the Fine or Medium Fine converter switches, while the location for the other fingers is shown in phantom. The button 184–3 on the third microswitch is shown in dotted outline. With such a follower construction, in FIG. 12, which is a sectional view taken through the Medium Fine section, the wide portion of all four followers 182–1 to 4, appears in the view with only the narrow finger extending therefrom for the fourth converter switch also appearing in the view.

By providing sixteen cam rollers 180 in the first set, the first Fine switch 179–1 is actuated sixteen times each revolution of the cam stack. With a saddle lead screw having a pitch of ½ inch per revolution, the saddle lead screw makes two revolutions per inch of saddle movement. The first Fine switch 179–1 is thus actuated five hundred and twelve "ons" per inch of saddle travel (16 x 32=512) and five hundred and twelve "offs" providing one thousand and twenty-four changes of state of this Fine switch per inch of saddle travel. Each change of state of such first Fine switch 179–1 thus represents $1/1024$ inch, or about .001 inch of saddle movement, and the position of the saddle within about .001 inch from the reference.

The chart of FIG. 19 diagrammatically depicts the successive changes of state of the first Fine switch 179–1 in the left-hand column. The numeral "1" represents the actuated state of this converter switch, while zero represents the deactuated state of this switch. Reading down in the left-hand column, it will be seen that the switch changes state for each $1/1024$ inch of saddle movement. Moreover, the instantaneous state of this switch for any saddle position may readily be determined from this chart, although only the most significant dimensional increments are included so that a picture of the states of all sixteen switches can be given within the spacial limits of the drawings. Thus the state of this first Fine switch at $1/64$ inch and $1/32$ inch is shown, as well as the state .001 inch short of such increments.

In the arrangement herein illustrated for the Z converter, each actuation of the second Fine switch 179–2 represents approximately .002 inch of saddle movement. To achieve this result, this second switch 179–2, which is located 90° from the first switch 179–1, is actuated by a second cam carrying eight equally spaced rollers 180

(FIG. 16). Such cam rollers actuate the second switch 179–2 via a finger 182–2. This second Fine switch finger is provided with a long crimp providing a long offset portion 195 causing the finger to dwell in the deflected position the same length of time as in undeflected position thereby to actuate the second Fine switch 179–2 eight times each revolution of the cam stack, holding the switch actuated for the same interval it is deactuated. The second Fine switch 179–2 is thus actuated two hundred and fifty-six "ons" per inch of saddle travel ($8\times32=256$) and two hundred and fifty-six "offs" providing five hundred and twelve changes of state of the second Fine switch per inch of saddle travel. Each change of state of the second Fine switch thus represents $\frac{1}{512}$ inch, or about .002 inch of saddle movement.

Again referring to the chart of FIG. 19, it will be seen that the second column depicts the changing state of the second Fine switch 179–2 as the saddle travels. The state of this switch at various increments of saddle movement is also shown.

Also referring to FIG. 17, the third cam actuates the third Fine switch 179–3 to provide two hundred and fifty-six changes of state of the latter per inch of saddle travel or about .004 inch of saddle movement for each change of state of this third Fine switch. To achieve this result. the third cam is provided by four pairs of rollers 180 equally spaced about the cam stack periphery and the follower finger 182–3 is shaped like the finger used with the second Fine switch 179–2 with a long crimp providing a long offset 195 causing equal periods of dwell in the "on" and "off" positions. Reference may be made to the chart of FIG. 19 in the third vertical column of which the changing states of this third Fine switch 179–3 is depicted.

Following the principles guiding the arrangement of cam rollers as previously described, the fourth Fine switch 179–4 is actuated by a cam (FIG. 18) provided by two sets of four rollers 180 each to provide one hundred and twenty-eight changes of state of this switch per inch of saddle travel, with each change of state of the same duration. Further reference may be made to the chart of FIG. 19 wherein the fourth column illustrates the changing states of the fourth Fine switch 179–4. Such sets of rollers appear in the foreground of the view of the cam stack in FIG. 14.

The other stacks of cams are constructed in a like manner to the cam stack of the Fine switches. Thus the stack 175MF driven directly by the lead screw and actuating the Medium Fine switches 179MF includes a first cam provided by sixteen rollers, a second cam provided by eight equally spaced rollers, a third cam provided by four pairs of rollers, and a fourth cam provided by two sets of four rollers each. The finger followers 182 are similarly constructed with only the finger 182–1 associated with the sixteen roller cam having a short crimp 193. With a cam stack so constructed and arranged, and driven at the speed of the lead screw providing two revolutions per inch of saddle travel, the first of the Medium Fine switches has sixty-four changes of state ($2\times32=64$) per inch of saddle travel such that each change of state represents $\frac{1}{64}$ inch. The second of the Medium Fine switches changes state at half the rate of the first such that each change of state thereof represents $\frac{1}{32}$ inch of saddle travel, each change of state of the third of the Medium Fine Switches represents $\frac{1}{16}$ inch of saddle movement, and of the fourth of the Medium Fine switches represents $\frac{1}{8}$ inch of saddle travel.

Similar considerations prevail for the medium Coarse and Coarse switches. Because of the stepdown drives, the cams associated therewith rotate slower that the lead screw such that each change of state of the first of the Medium Coarse switches, for example, represents $\frac{1}{4}$ inch of saddle travel ($\frac{1}{8}$ rev./in.$\times32=4$ changes of state per inch of travel). Each of the succeeding three cams in the Medium Coarse set operates the associated switch 179 at half the rate the preceding switch is operated: that is, to represent $\frac{1}{2}$ inch, 1 inch and 2 inches of saddle movement, respectively. In the case of the Coarse switches 179C, the latter are operated to represent 4 inch, 8 inch, 16 inch and 32 inch increments of saddle travel.

Again referring to FIG. 19, as before mentioned the four left-hand columns graphically represent the changing state of the Fine converter switches for travel of the saddle. It should be apparent that the second four columns represent the changing state of the Medium Fine converter switches, the next four columns represent the changing state of the Medium Coarse converter switches and the right-hand four columns represent the changing states of the Coarse converter switches. Taking the first column of the right-hand set, for example, the switch for which the states are shown in this column changes state for each 4 inches of saddle travel so that it remains in the deactuated state through 3.999 inches of saddle travel in either direction whereupon as the saddle completes 4 inches of movement such switch is actuated represented by the numeral 1. Note that all other switches will be deactuated with the saddle 4 inches from the extreme travel position. It should be clear that the instantaneous postion of the saddle 31 is represented by a unique combination of actuated converter switches. Moreover, it is emphasized that in this case, the converter cams are rotated in the reverse direction with saddle movement from right to left so that the Z converter switches change state in a substractive sense responsive to such saddle movement. The foregoing also applies to the Y converter with downward ram movement.

A further feature of this converter relates to the provision of a simplified limit means defining the range of the converter. Since 180° of rotation of the Coarse cam stack 175C represents the limit of the range of this converter, this Coarse cam stack carries a fifth limit cam provided by a single roller 199 supported by the fifth cam disc 186E. A pair of spring fingers 200, 201 on opposite sides of this limit cam, constructed and mounted similar to the other spring fingers 182 (FIG. 13) are contacted by the roller 199 as the cam disc reaches the limit positions and are deflected to actuate Z+ and Z− limit switches carried on opposite sides of the cam. Similar limit means in the form of cam actuated Y+ and Y− limit switches are provided in the Y converter.

*Converter transmission*

Referring to FIGS. 6–12 for details of the converter transmission, the cam stacks are driven from an input shaft 204 coupled by any suitable means to the saddle lead screw 36 providing an extension thereof. The transmission includes, as will have already been noted, four main sections: an up drive section for the Fine switches cam stack; a direct drive section for the Medium Fine switches can stack; and two step-down drive sections for the Medium Coarse and Coarse switches cam stacks. The up drive and step-down drives are planetary drives, as shown diagrammatically in FIG. 6. The transmission also includes a fifth seciton at the right end of the unit as viewed in FIG. 6, relating to the auxiliary slowdown means.

*(1) Fine section*

Considering, for example, the Fine transmission section 177F appearing at the left end as viewed in FIG. 6, this section includes two planetary gear sets providing an up drive at 16:1 ratio for the Fine switches cam stack 175F. Such cam stack, as hereinbefore described, includes five axially spaced annular discs 186A–E supporting rollers 180 which serve as cams. Referring also to FIG. 7, these annular discs are assembled with spacer plates 190 and pins 192 to form a rotor which is journaled by means of bearings 205 on the shaft and pinned to a spline 206 free to turn on the shaft 204 and serving as the sun gear for the secondary planetary gear set. The latter, as shown in FIG. 10, also comprises a ring gear 208 and planet gears 210 supported on a planet gear carrier 212 fixed to the sun gear 214 of the first planetary gear set which also includes a ring gear 216, and planet gears 218. Still referring to FIGS. 6 and 7, such planet gears 218 are carried on the pins 192MF assembling together the elements of the Medium Fine cam stack 175MF. Since such Medium Fine cam stack 175MF is driven directly by the shaft 204, it serves as the planet spider for carrying the planet gears 210 and supplies input torque to the first planetary of the Fine section. Each planetary gear set provides a 4:1 speed ratio between the input to the planet gear carrier and the output to the sun gear, providing the desired 16:1 total speed ratio for the transmission section. With a saddle lead screw having a pitch of ½ inch, the lead screw makes two revolutions per inch of saddle travel. The rotor supporting the fine switch cam stack thus makes 32 revolutions per inch of saddle travel.

(2) *Medium fine section*

As herinbefore mentioned, the Medium Fine cam stack 175MF is driven directly by the input shaft 204 so that such cam stack makes two revolutions per inch of saddle travel. The cam stack is connected to the shaft by suitable means such as by pinning the spacer plates 190 to a spline 220 keyed to the shaft 204 as shown in FIG. 12.

(3) *Medium coarse section*

The third Medium Coarse transmission section 177MC provides a 16:1 step-down drive through two planetary gear sets for a cam stack 175MC for the Medium Coarse switches 179MC constructed like the other cam stacks. To provide the requisite 256:1 speed reduction for the fourth similarly constructed cam stack 175C actuating the Coarse switches 179C, the fourth transmission section 177C providing a 16:1 speed reduction is driven from the previous or third transmission section. Using such drive ratios, the cam stack for the Medium Coarse switches makes ⅛ revolution per inch of saddle travel, while the fourth cam stack makes 1⁄128 revolution per inch of saddle travel.

Input to the Medium Coarse transmission section is from a sun gear formed by one end of the spline 220 which is keyed to the transmission input shaft 204. The first planetary gear set of this section includes planet gears 222 meshed with a ring gear 223 and supported by a planet carrier 224 fixed to the sun gear 226 for the following planetary which may be formed by suitable means, herein shown as a spline free to rotate on the shaft 204. The sun gear 226 for the second planetary gear set drives the rotor carrying the third cam stack 175MC through planet gears 228 meshed with a ring gear 230 and supported on pins 192MF assembling the cam discs of the Medium Fine cam stack.

(4) *Coarse section*

With the fourth transmission section 177C driven from the third transmission section 177MC, the input is derived from a sun gear 232 herein provided by one end of a spline 234 rotatable on the shaft 204. This spline 234 is fixed by any suitable means to the Medium Coarse cam stack 175MC. This transmission section 177C also includes two planetary gear sets to rotate the fourth cam stack 175C which is constructed in similar fashion to the other cam stacks except that it further includes a limit switch cam roller 199 on the right-hand end of the cam stack as viewed in FIG. 7. The first planetary gear set includes a ring gear 236, planet gears 238, and a planet gear spider 240, and the second planetary gear set includes the sun gear 242 fixed to the previous planet gear spider 240, ring gear 244, and planet gears 246 supported by the pins 192C assembling the fourth cam stack rotor 175C. The cam stack rotor 175C is journaled on the shaft 204 by means such as bearings 247.

(5) *Slowdown section*

A further feature of this invention relates to the provision of means for slowing down the travel of the saddle or ram a predetermined interval before the end point is reached to prevent overtravel. This is accomplished in the present case by similar means in each of the Y and Z digital to analog converters and to the control system associated with such converter means.

In general, taking first the drive for the saddle for explanation purposes, this anticipation feature provided by constructing the Z converter, on the saddle lead screw, such that the converter switches 179 show that the end point designated by a single line of panel End Point Position pushbuttons has been reached a short interval before the saddle lead screw rotating at a relatively fast feed rate has turned to the angular position where the cutting tool is precisely at the end point. At this stage, provision is made to slow down the saddle feed to a predetermined slow absolute velocity, so that the lead screw may be rotated through the remaining angle at the slower rate to bring the saddle and thereby the cutting tool to the desired end point without overshoot. A similar provision is included in the Y converter on the ram lead screw cooperating with means in the control system to slow down the ram for the final amount of travel to prevent overshoot.

Taking first the constructional aspects of the converters that relate especially to this anticipation feature, the diagramattic illustration of the Z converter transmission in FIG. 6 shows that the third an fourth transmission sections 177MC and 177C, driving the cam stacks 175MC and 175C for the Medium Coarse switches 179MC and Coarse switches 179C, respectively, are driven from the transmission input shaft 204 through two torque transmitting connections. One such connection is through the main sun gear 220 of the Medium Coarse transmission section, as previously described. According to this aspect of the present invention, a predetermined amount of backlash is purposely inserted into the planetary gear sets of this Medium Coarse transmission section thereby to allow the third cam stack rotor 175MC to be advance a small angular distance ahead of the saddle lead screw 36 so that the converter switches 179MC are actuated by this cam stack to represent apparent saddle position a short distance ahead of the actual saddle position. Putting it another way, the state of the converter switches of this Medium Coarse section apparently represents an increment of saddle movement before the saddle has actually traveled the full increment by a distance according to the amount of backlash.

The other such connection is through an auxiliary drive section 177A comprising a planetary gear set located adjacent the right end of the input shaft 204 and providing, when a slipping auxiliary magnetic clutch 248 is energized, a 4:1 speed reduction tending to operate the third cam stack rotor 175MC at a faster rate than such cam stack rotor is driven through the 16:1 speed reduction third transmission section and main sun gear 221, thereby to wind up the gears of the Medium Coarse transmission section to advance the cam stack rotor 175MC ahead of the saddle lead screw an angular distance determined by the amount of backlash. The arrangement is such that with the slipping auxiliary magnetic clutch 248 energized, the third cam stack 175MC is driven through the auxiliary drive 177A at the 16:1 speed reduction rate at which the cam stack is unlatched by the third transmission section 177MC.

As will be noted from FIGS. 6 and 7, the auxiliary drive 177A includes a single planetary gear set having an output sun gear fixed to a tubular extension 233 journaled on the shaft 204 and fixed by keying or similar means to the spline 234 attached to the Medium Coarse cam stack 175MC. This auxiliary drive also includes a ring gear 249 which is mounted on the magnetic clutch armature 248A and is coupled by magnetic flux through an air gap to a clutch rotor 248R supported for rotation in the casing. This clutch rotor 248R is fixed to a carrier 250 which supports a set of rods 252 (FIG. 8) reaching through arcuate slots 254 in the ring gears to the Fine converter section. With the magnetic clutch 248 energized by connecting its clutch coil to a source of potential, the clutch armature 248A is magnetically coupled to the clutch rotor 248R thereby causing a sufficient drag to be placed on the ring gear 249 to transmit torque through the planet gears 255 of the auxiliary drive to rotate the Medium Coarse cam stack via the sun gear and tubular member 233. In this manner, torque is provided to wind up the gears of the Medium Coarse transmission section to maintain the third cam stack angularly ahead of the transmission input shaft.

The limit of amount of angular play permitted by the backlash is determined by the accuracy of positional information provided by the Medium Coarse converter switches. In the present case where the Medium Coarse switches provide data as to the position of the lead screw within ¼ inch, the limit of the amount of backlash is set by this dimension such that after the auxiliary magnetic clutch is deenergized and the Medium Coarse cam stack stops and waits while the lead screw continues to turn to take up the backlash, the distance remaining to be traveled to the end point is less than ¼ inch.

The reaction torque tending to turn the clutch rotor 248R when the magnetic clutch 248 is energized also is used for a control purpose to be described in more detail later. It will be noted, however, that the clutch rotor 248R and carrier 250 are supported for limited rotation in the converter casing. This rotation is limited by the auxiliary switch *Za*S hitting bottom under the actuation of the rollers 256, 258 and the finger 260 (FIG. 9). With the magnetic clutch 248 energized, the rods 252 are shifted in one direction or the other to engage the fingers 182 in the Fine section only, causing the fingers in such section to be lifted out of cam contact. The fingers in all other sections are shortened so that the rods do not engage the ends of the fingers in one direction of movement of the rods, and the fingers in such sections are curved slightly as shown in FIGS. 15–18 so that the rods do not quite touch the fingers adjacent the hinged end in the other direction of movement of the rods.

In the operation of the machine tool, assume for illustration that the saddle lead screw 36 is rotating at a relatively fast feed rate to move the saddle toward a desired end point. As the saddle lead screw approaches the angular position corresponding to this end point, with the auxiliary magnetic clutch 248 energized, at the angular distance short of the actual end point, determined by the amount of backlash, the Medium Coarse and Coarse converter switches 179MC and 179C show by their combined state that the end point has been reached. By means in the control system responsive to such converter switches shifting to this end point condition, the auxiliary magnetic clutch is deenergized thereby effectively decoupling the auxiliary drive connection 177A from the third cam stack. By means also included in the control system, the feed clutches FC1–F, FC1–S and FC2–FC4 of the feed transmission are shifted to provide a relative feed rate providing an absolute feed velocity slow enough to avoid overshoot as the cutting tool is brought to the desired end point. Such feed clutch control means, in the present case, includes an auxiliary slowdown switch *Za*S which is operated when the auxiliary magnetic clutch 248 is energized and deenergized. Such slowdown *Za*S switch is included in the present converter between the two limit switches Z-lim adjacent the rod carrier 250. The slowdown switch *Za*S is actuated in either direction of rotation of the carrier 250 by a pair of rollers 256, 258 supported, as shown in FIG. 9, by the carrier 250 via a spring finger 260.

CONTROL SYSTEM

A suitable control system for operating a machine tool in accordance with this invention, is schematically depicted in FIGS. 21–23. In general, with this control system a machine tool is adapted to be operated by hand in carrying out a program of machining steps involved in machining a workpiece. With a vertical turret lathe as shown in FIGURE 1, hand operation is achieved through the usual saddle or ram power positioning means found on such a machine tool controlled through the panel pushbuttons and control circuit. In this respect, the control system includes the usual means of control for the illustrative machine tool. By further means in the control system, according to this invention, the entire program of such machining steps is recorded and the machine tool is caused to repeat the programmed machining steps in an automatic cycle to machine subsequent pieces.

*Setting in data for repeat cycle*

One of the important features of this invention is that a skilled machinist can carry out by hand a series of steps to machine a workpiece without pre-planning the machining process, and the recording means provided herein is constructed and arranged for ease of storage of data as to feeds and speeds and storage of terminal end point data. It is an important advantage of the present invention, that the machinist records only the final product of his conventional trial and error system of operating the machine tool. All the data for the trial steps is cancelled in the course of directing the tool, and only the final terminal end points and desired feeds and speeds are retained.

A further important feature of this invention is that it contemplates positioning of the machine tool components at all times under power, so that the condition of the drive and control mechanism will be the same as the terminal end point is approached whether in the manual data set in cycle or in the repeat cycle, so that the components will be brought precisely to the said end points in the repeat cycle under the direction and control of the system and the stored program.

To illustrate the manner in which a typical program is recorded by the control system including the pushbutton keyboard on the control console, reference is made to the machining process illustrated in FIGS. 24–28. Setting up the program for a repeat cycle for carrying out the twenty machining steps shown in these figures will be explained assuming that the program of steps has been planned with the speeds and feeds to be used at each step, but the operator will work out the position settings as the process is carried out under manual direction. The chart of FIG. 29 shows the feeds and speeds for all twenty steps of FIGS. 24–28, the combinations of Feed select and Speed select pushbuttons to obtain such feeds and speeds, and also shows the combinations of UP-DOWN-IN and OUT pushbuttons providing the requisite saddle and ram movement for all steps.

*Manual operation*

Figures 24, 25, 26, 27, 28:
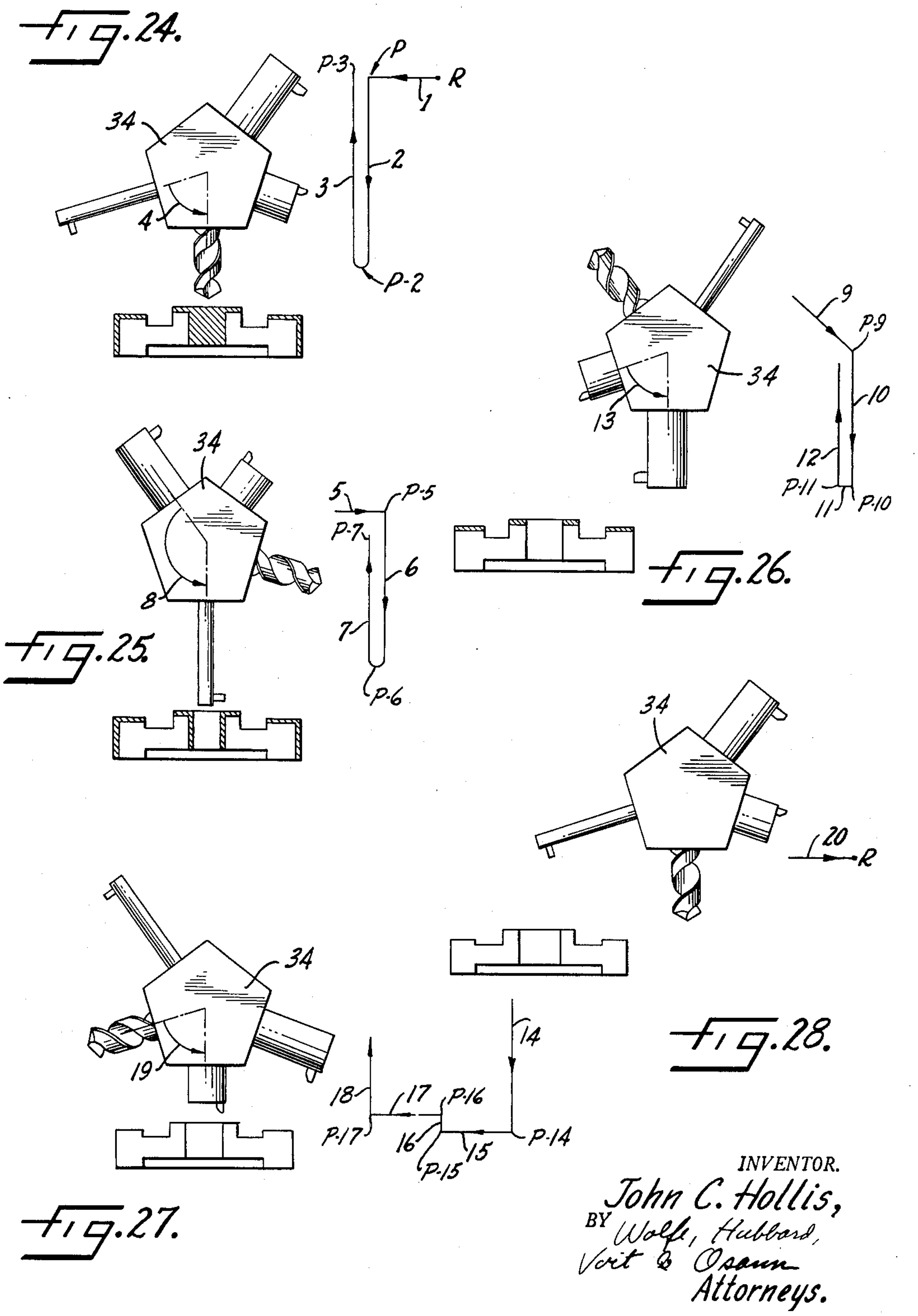

Referring, therefore, to FIGS. 24–28 for a diagrammatic illustration of the step-by-step process, FIG. 24 illustrates steps one to four. With the saddle 30 and the ram 31 at the reference point, where the saddle is at the right end of the rail as viewed in FIGURE 1 and the ram is raised, the first step requires that the saddle be fed in toward the table until the boring tool in the turret is directly over the center of the table at the first end point P. In the second machining step, the ram is fed down until the boring bit has broken through where the ram has reached the second end point P2. In the third machining step, the ram is raised to withdraw the boring bit, and the ram is elevated to the third end point P3 which, in this case is the Y+ limit, to permit the turret to be indexed, in the fourth step, to move a long boring bar carrying a facing tool into position over the workpiece.

In the manual operation of the machine tool for carrying out the machining steps illustrated in FIG. 24, involving taking the rough boring cut of step two, with the control system herein described, the provision for power positioning of the saddle or ram will be utilized to cause the ram to move down. For this purpose, the DOWN button D will be pressed in and the Feed and Speed select buttons punched in as desired. After the boring bit has broken through, the ram is stopped by releasing the DOWN button D by means of the left hand R button.

Where a traverse speed is desired, the T button is punched in so that in the repeat cycle the traverse speed will be used. The chart of FIG. 29 contains in lines one to three the combination of Feed select and Speed select switches required for the predetermined saddle and ram feed rates. In line one of this chart, the cross in the I row designates such button as latched in for the first machining step. With the T button latched in, the fast traverse rate will be used.

After the turret has been indexed in step four to move a finishing boring tool into operative position, the succeeding machining steps numbered five through seven, illustrated in FIG. 25, are carried out. The fifth step is to position the boring bar to produce the proper bore diameter. Since the final exact setting is not known, is must be found by trial and error. To position the boring bar, the saddle is moved out in the Z-direction to position the bore at the end point P5, and the final setting is obtained manually. Referring to the chart of FIG. 29, it will be noted that the feeds and speeds are not set in for the fifth step and manual setting is contemplated. The operator than makes a test cut, running the boring bar down only far enough to accommodate an inside micrometer. If the bore obtained is undersize, necessitating a correction, such correction is made in the position of the saddle. Again the boring bar is run down to produce a sample bore. This time the bore should be correct and the sixth machining step may be carried out by running the ram down in the Y-direction until the boring bar breaks through at the end point P6. The seventh machining step may then be carried out wherein the boring bar is withdrawn by raising the ram to the reference axis and the cutting tool has reached the end point P7, where the eighth step, in which the turret is indexed, may be carried out. The remaining machining steps, up to the final step numbered twenty in FIG. 28, are carried out in a similar manner.

This procedure is not significantly different from the trial and error method used in operating a standard vertical turret lathe. In any machining process there are only a few steps where the end point position must be set so accurately as required, for example, in the fifth machining step. On the sample workpiece being machined in FIGS. 24–28, there are only four critical dimensions, necessitating four such highly accurate settings: namely, of steps 5, 11, 14 and 16.

To describe in somewhat more detail how the machining steps of the program illustrated in FIGS. 24–28 are carried out and the data as to such steps is recorded by means in the control system for subsequent operation of the machine tool in an automatic cycle, reference is made to the schematic wiring diagram of FIGS. 21–23 and the illustration of the control console panel and mechanism found in FIGS. 3 and 4. The control system is shown with all switches in their normal or deactuated position and all relays and solenoids deenergized. Referring to FIG. 21, it will be seen that the main conductors 261, 262 are energized from a suitable D.C. source, thereby energizing the table brake coil BR to hold the table against rotation through the normally closed JOG switch contacts JOG–1 and RUN switch contacts RUN–1. Still referring to FIG. 21, across the lines 261, 262 is a circuit including the Start and Stop switches 263, 264 for the table motor such that by closing the Start switch 263, found on the console panel, the table motor relay 265 is energized which closes its holding contacts 265–1 to maintain the relay energized and also closes contacts 265–2 connecting the table motor to a suitable 3-phase A.C. source to start the motor.

In starting a machine tool having a control as shown, referring to FIG. 21, after the table motor is started by means of start and stop buttons 263, 264, the RUN button on the panel 105 is actuated to close its RUN–2 contacts and thereby energize the circuit to the speed select switches and the table speed clutches. With the latter set to provide a desired table speed, the table will rotate at such speed.

Operation of the saddle and ram under manual control is achieved by actuation of one of the UP, DOWN, IN or OUT buttons on the control panel after the feed rate has been set by the operator for the particular machining step, using the feed rate selection push buttons (FIG. 3) at the right-hand side of the panel. To stop the ram or saddle in a manually directed step, the actuated UP-DOWN, IN or OUT button is released by the Reset button (FIG. 5). The ram or saddle may be inched to its final position by first actuating the stop button (FIG. 21) which places the speed transmission in neutral by opening its RUN–2 contacts, then actuating the UP-DOWN, IN or OUT button to obtain the desired direction of movement of the saddle or ram, and next using the Jog button to engage the table speed transmission clutch 47 by energizing its clutch coil SC–1A through the Jog–2 contacts of the Jog switch. With the table rotating and the feed transmission engaged, the saddle or ram can be jogged to a point predetermined by the operator. In this manner, for example, the saddle may be brought to the end point P indicated for the first step of the machining sequence illustrated in FIG. 24.

With the machine element, either the saddle or the ram, brought to the desired position by manual control, the signal lights on the panel will be lit in a pattern representing the position of the machine element, such signal lights further indicating which push buttons in the group marked END POINT POSITION in FIG. 3 should be actuated to record that position for the repeat cycle. After the push buttons in the line for the particular machining step have been actuated, the machine element will move to that same end point in the repeat cycle. In the repeat cycle the machine element will be automatically slowed down and then stopped at the end point as set into the push buttons on the panel. Referring to FIG. 21, the sequence is that as the machine element nears the end point determined by the end point position buttons, the slow down switch contacts ZAS–2, YAS–2 are opened to deenergize the feed select switches and thereby the feed clutches, while the slow down switch contacts ZAS–1, YAS–1 are closed to energize the slow feed complex, whereby the feed rate is dropped to a slow absolute velocity for finally approaching the end point.

Referring now to FIG. 23, when the point is reached the converter switches match the end point position switches thereby deenergizing both the C and F lines which causes the saddle lead screw clutch Z+ or Z− to drop out, or the ram lead screw clutch Y+ or Y− to drop out if the ram is being driven, thereby disengaging the lead screw from the feed drive and stopping the machine element. In addition to the feed and speed buttons and the end point position buttons, each line of the panel 106 also includes an N button. With the N button actuated, after the machine element has reached the end point and the drive thereto is disengaged, the carriage will be automatically shifted one step in operating position. buttons for the next machining step in operating position. Assuming, for example, that the second end point P–2 as illustrated in FIG. 24 is set in by the end point position push button, and the DOWN button is actuated to call for the required down movement of the ram, the converter switches on the ram lead screw will not match the position switches for the end point P–2 and hence the C and F lines will be energized. Referring to FIG. 23, with the down switch DS actuated, the contacts DS–1, DS–1*a* thereof will close to energize the Y clutch and the ram lead screw 35 via the feed transmission at the feed rate established by the feed rate push buttons actuated in line 2. FIG. 29 illustrates the feed rate .036 desired for step 2 is obtained with the feed push button "1" in the slow position (1S) which is its deactuated state, as indicated in FIG. 21. FIG. 29 also illustrates the table speed desired as 160 which is obtained with push button "2" actuated and the first push button in its "1" position which is its actuated position as indicated in FIG. 21.

*Speed and feed selection*

The RUN, STOP and JOG button actuated switches are handily mounted on the machine tool table speed panel 105 so that they may be operated by the machinist to start or stop the table, ram and saddle at feeds and at speeds and directions according to selective energization of the speed clutch coils SC1*a* and SC1–SC4, feed clutch coils FC1–S, FC1–F and FC2–FC4, and the Z and Y clutch coils. Selective energization of these clutch coils, as shown in FIGS. 21 and 23, is achieved by selective actuation of the Table Speed select switches SS1–4, the Feed select switches FS1–4, and the UP-DOWN-IN and OUT switches US, DS, IS and OS. These switches, referring now to FIG. 4, are mounted on the panel carriage 107 so as to be actuated by a single horizontal line of panel pushbuttons. With the carriage at any level or line of pushbuttons, therefore, a table speed may be selected of any one of sixteen possible rotational speeds with the transmission of FIG. 2 by pushbotton actuation of combination of Speed select switches SS1–4. Similarly, a feed rate may be selected by combinations of the Feed select switches FS1–4 for either In or Out movement of the saddle in the Z direction, Up or Down movement of the ram in the Y direction, or movement at 45° by combinations of both saddle and ram movement.

Illustratively, to carry out the first machining step of FIG. 24 under manual control, the saddle will be moved by the operator to position the cutting tool at a position P over the center of the table.

The feed rate at which the saddle moves is predetermined by the operator who selects either the traverse rate, by punching in the T button, in the first line on the control panel 106, or by selecting any desired slow or fast feed rate by operating the appropriate feed rate selection button which in turn will actuate a feed select switch of the set FS1–FS4. Assuming that the T button, as shown by the shading in FIG. 3 for line 1 in the panel, is actuated to secure traverse rate in the first step involving saddle movement to the position P, it will be seen by referring to FIG. 21 that contacts T–1 of the traverse switch T will be closed and the normally closed contacts T–2 will be opened. The line containing the contacts T–1 leads to the traverse clutch coil and the starting coil 276 for the traverse motor. Such line is deenergized at the start because the slow down contacts ZAS–2, YAS–2 are normally open.

With the arrangement shown, the saddle is started at a slow feed rate and then the drive is automatically shifted to the traverse rate. For this purpose, referring to FIG. 2, before the clutch 82 is shifted to its slow position by energizing the clutch coil FC1–S, this clutch coil is energized by the normally closed slow down contacts ZAS–1, YAS–1 and the bypass 500 around the switch contacts FS*a*–4. As soon as the saddle lead screw starts rotating, with the auxiliary clutch Z*a* energized, the normally closed contact ZAS–1 will be opened, deenergizing the clutch coil FC1–S, which places the clutch 82 in neutral while the traverse clutch coil is energized to place the traverse motor in direct drive to the drive shaft 76. The traverse clutch coil is energized through the traverse switch contacts T–1 which upon rotation of the saddle lead screw and resultant closing of the contacts ZAS–2 are energized from the D.C.+ bus.

A similar sequence is followed to start the ram in motion. Thus the saddle or ram lead screws are started at a slow speed and subsequently automatically shifted to the traverse rate or to the preselected slow or fast feed rate. It will be noted that before the start, the feed clutch 85 at the input to the feed transmission is shifted to its up-drive position because the clutch coil FC–4 for such clutch is energized from the D.C.+ bus via the normally closed slow down contacts ZAS–1, YAS–1 and the bypass connection 501 for the switch contacts FS*a*–1. Furthermore, as previously indicated the clutch 82 at the output from the feed transmission is shifted at the start from its neutral to its slow position, to that the feed transmission provides a slow starting feed rate for the ram or saddle. After motion is started, the slow down contacts associated with the saddle or ram lead screw, depending on which element is started, are actuated thereby energizing the feed select switches to cause the feed transmission to be automatically shifted to the state set by means of the line of push buttons for that particular machining step. In the case of the first machining step as illustrated in FIG. 24, with the T button actuated as shown by the shading in FIG. 3 the traverse clutch and traverse motor will be energized to provide the traverse rate of movement for the saddle.

Still referring to FIG. 2, the output drive shaft 76 of the feed transmission is coupled to either or both the saddle and ram lead screws by means of the Z+, Z—, Y+ and Y— clutches. Now referring to the wiring diagram, particularly FIGS. 21 and 22, it will be seen that the coils for Z+ and Z— clutches, and the Y+ and Y— clutches, are energized from the Coarse line C and Fine line F through the switch contacts shown in series with such clutch coils. The latter switch contacts include a normally closed set for the Y and Z limit switches and further include a set for the UP-DOWN-IN and OUT switches. These clutches, as shown in the lower right-hand part of the schematic wiring diagram portion in FIG. 23 are thus connected in circuit by means of the UP-DOWN-IN and OUT switches US, DS, IS and OS, respectively. To move the saddle in the Z+ direction in toward the table so as to move the cutting tool to the first end point P (FIG. 24), the operator will punch the IN button I on the control panel 106 thereby actuating the IN switch IS. With the first set of contacts IS–1 closed, the Z+ clutch is connected between the —D.C. line 262, and the paralleled C and F lines 270, 272.

The C and F lines 270, 272 are in turn energized from vertical Z or Y buses at the left side of FIGS. 22 and 23 which in turn, are connected to the +D.C. line 261 through UP-DOWN-IN and OUT switch contacts US–2, DS–2, IS–2 or OS–2 ganged to the switch contacts US–1, DS–1, IS–1 and OS–1 in FIG. 23, such that either the Z or Y bus is energized with either of the UP-DOWN-IN and OUT pushbuttons depressed. With the arrangement of switch contacts US–2, etc., as shown in FIG. 22, the Z bus is energized and the Y bus is deenergized when both the saddle and ram are operated in keeping with the operational mode that the Z axis is the master axis.

It will be seen that separate means of connection to the C and F lines are provided from the Y and Z buses. Taking the Z bus, for example, the Coarse and Medium Coarse switches 179C and 179MC of the Z converter are shown in individual circuits connected in series with the Coarse and Medium Coarse End Point Position switches such that with both the Z converter switch 179 and the End Point switch of a circuit in the same state (i.e., actuated or deactuated) a current conducting connection is made to the associated signal lamp but with such switches not in the same state a current conducting connection is made not to the signal lamp but to the C line thereby energizing the latter. A similar circuit arrangement is shown between the Y bus and the C line.

It will be noted, furthermore, that the individual circuits between the Y and Z buses and the F line include the Fine and Medium Fine converter switches 179F, 179MF, in series with the corresponding Fine and Medium Fine End Point select switches such that with both switches of an individual circuit in the same state the F line is energized through that circuit. In this arrangement of converter switches and End Point Select switches, with the saddle and ram at the reference position, and thus the Y and Z converter switches 179 in the state shown, by actuating any combination of End Point Position switches either or both the C and F lines are energized. Furthermore, the C line will be energized where at least one of the Medium Coarse or Course switches is included in the combination not actuated, and the F line will be energized when at least one of the Medium Fine or Fine switches is not actuated.

Still referring to FIGS. 22 and 23, with the saddle and ram at the extreme right hand and raised position (FIG. 1) all converter switches 179 are lifted by the cams of all cam stacks to their up position. At the extreme travel position at the left side of the machine, not usually approached in practice, all converter switches will be in the down position. As the saddle and ram lead screws turn to move the saddle or ram toward this latter position, the converter switches are actuated so that the state of such switches at any instant represents the instantaneous positions of the lead screws. It will be understood, however, that after saddle movement from the extreme right of a given increment, the state of the Z converter switches represents, in binary, 63.999 inches less that increment. Similarly, after ram movement from the extreme up position of a certain increment, the state of the Y converter switches represents, in binary, 63.999 inches less that certain increment. With this arrangement, where the saddle and ram are at any point remote from the extreme travel point, and with any combination including less than all the Medium Coarse and Coarse pushbuttons punched in, C line is energized through the circuits having the End Point select switches corresponding to the pushbuttons not included in the pushbutton combination punched in. In the case of saddle movement, with the IN button I punched in, the saddle will move until a null is reached where the Z converter switches match the End Point select switches. The operation is the same involving the Y converter switches in the case of ram movement.

After selecting, in the foregoing manner, the desired feeds and speeds for the first machining step, the machinist punches in the IN button I causing the saddle to move in the Z+ direction. Saddle movement is stopped when the cutting tool is over the workpiece by the operator releasing the IN button. The saddle speed will be determined by the combination of select switches actuated. In this case the first speed select switch SS1 is closed so that the fast table speed clutch coil SC1 will be energized.

A slow feed clutch coil complex is normally energized through the normally closed series connected slowdown switch contacts YAS–1 and ZAS–1 and the auxiliary circuit switch FS*a*–1–4 to start the saddle lead screw rotating. With the auxiliary magnetic clutch coil *Za* energized from the Coarse line C (FIG. 23), when the saddle lead screw starts to rotate, reaction torque causes the Z converter rod carrier 250 to rotate thereby actuating the auxiliary slowdown switch ZAS causing its normally open contacts ZAS–2 to close and its other contacts ZAS–1 to open. In this manner, the auxiliary circuit is de-energized and the parallel circuits including the feed clutch coils FC1–S, FC1–F and FC2–FC4 are selectively energized through the slowdown switch contacts ZAS–2, thereby shifting the transmission from the slow rate to the feed rate set by the Feed select pushbuttons.

In the illustrative case, with the pushbutton FS1 operated for the fast feed rate, the fast clutch coil FC1–F is energized (FIG. 2), shifting the feed transmission from slow and providing a drive connection to the shaft 76. The saddle lead screw is driven at the fast feed rate. With the IN button I in line one punched in, the switch IS is actuated thereby energizing the Z+ clutch coil to engage the clutch 88 in the direction to move the saddle in the Z+ direction by the feed transmission through the Z+ clutch 88. With the table rotating and the feed transmission engaged and coupled to the saddle in this manner, the saddle will travel in toward the table. The cutting tool will be caused to travel toward the first end point P until the machinist punches the R or reset button in line one on the left side of the control panel, thereby releasing the IN button, and de-energizing the Z+ clutch coil causing the saddle to stop. It might be necessary in moving the cutting tool to point P to punch in and release the IN button a few times to precisely align the cutting tool over the workpiece at the point desired. To determine whether the cutting tool has reached the first end point P, the operator may use any scales provided on the machine tool or may measure or otherwise check the position of the tool relative to the workpiece until the machining step has been completed to his satisfaction.

*End point selection*

Pushbuttons in the first line of the End Point Position block, or keyboard section, of the control panel 106 will be used to record this end point position P for later repeating the first machining step automatically. Each pushbutton in this section represents a dimensional increment of lead screw movement according to the legends assigned to the rows of pushbuttons. To avoid the necessity for human calculation of the required combination of pushbuttons to sum up the distance of the point P from the point R, or from any one end point to the succeeding end point, means are provided to furnish this information to the operator. It will be recalled that the Z converter on the saddle lead screw and the Y converter on the ram lead screw provide signals in binary form representing the instantaneous angular position of the screws and thereby the saddle and the ram. In carrying out this feature of the invention, such signals are utilized to energize the End Point signal lamps over the rows of pushbuttons in this section of the panel responsive to the position of the saddle or ram. Through the control system, as the saddle or ram advances, the condition of the signal lamps at any instant represents the instantaneous position of the cutting tool. With the cutting tool at the desired end point, in the present case the control system is so arranged that the signal lamps which are dark or in the OFF condition represent in binary form the distance of the saddle from the reference point R: that is, the end point P. To record this end point P, for the first machining step, the operator punches in the pushbuttons in line 1 under the dark lamps. This causes the dark lamps to light up thereby signifying visually that all requisite end point information has been set into the control panel for the first machining step.

With the IN button I punched in to cause the saddle to travel in the Z+ direction toward the first end point P, and, further, with the End Point Position pushbuttons punched in to record the desired end point P, all information is set into the control panel keyboard for carrying out the first machining step automatically. But since this first machining step involves no metal removal, the operator might decide that when this first machinery step is repeated automatically the saddle should be moved at the fast traverse feed rate. To this end, the Speed select and Feed select pushbuttons previously punched in, in the first line, will be cancelled by punching in the two right-hand-most R buttons in the first line. The T button will thereafter be punched in. This sets the fast traverse feed rate for the first machining step in the repeat cycle. With the clutch circuits deenergized, the traverse motor relay 276 is energized which closes its contacts 276–1 connecting the traverse motor to a suitable A.C. source thereby starting this motor; the traverse clutch is also energized to couple the traverse motor to the drive shaft 76 (FIG. 2).

From the control system schematic diagram FIG. 21, it will be seen that with none of the Speed select switches SSI–4 actuated, the clutch member 47 associated with the Speed select clutches SC1 and SC1*a* is in neutral thereby setting the table transmission in neutral. By pressing the T pushbutton the operator opens the second set of traverse switch controls TS–2 to insure that the Feed clutches FC1–S and FC1–F are deenergized and the associated clutch member 82 is in neutral, whenever the saddle or ram is to be driven at the traverse feed rate, to avoid damaging the feed transmission. The traverse clutch circuit is in parallel with the feed clutch circuits and, like the latter, is connected to the +D.C. line 261 through the normally open slowdown switch contacts YAS–2, ZAS–2. As previously described, the slowdown switch ZAS is actuated to close such contacts ZAS–2 following a momentary period of saddle lead screw rotation during which the slow feed clutch FC1–S is energized through the auxiliary circuit. Such slowdown switch ZAS is deactuated as the saddle reaches the slowdown point following which the source of +D.C. potential is removed from the clutch circuits when the saddle reaches the end point. Where the saddle and ram are at the end point, the slowdown switches in the Y and Z converters are in their deactuated state.

The operation of the control system is similar in the automatic repeat cycle; the slowdown switch contacts YAS–2 are normally open but are closed after the saddle lead screw starts rotating thereby connecting the +D.C. line 261 to the clutch circuits until the end point is approached by the saddle whereupon the slowdown switch is deactuated and the contacts ZAS–2 thereof are opened to insure that the feed clutch circuits are disconnected through this means from the +D.C. potential source or line 261.

Turning now to the procedure followed by the operation in setting the data as to the next machining step into the pushbutton panel, each line of pushbuttons also includes an "N" (next) pushbutton at the left margin of the center block on the panel. After all the other pushbuttons in the first line have been punched in and the first machining step is completed, the "N" button is punched in, causing the panel carriage 107 to step down to behind the second line of pushbuttons. This is achieved through the control system, the N solenoid and the ratchet mechanism 156. By means of the latching plate 146, the "N" button is held in, signifying the repeat automatic cycle later carried out, that when the selected End Point Position for that machining step has been reached, the next machining step will be carried out immediately thereafter.

Again referring to FIG. 24, in the second machining step the boring bit in the turret is lowered into cutting engagement with the workpiece while the latter is rotated by the table and moved downward to the end point P1 to bore a hole in the workpiece. To carry this second step out as a manual operation, the D pushbutton in line two of the control panel is punched in so that the ram will move downward in the Y– direction; feed rate, as shown in the chart of FIG. 29 for step two as .036 inch per table revolution, is selected by means of certain Feed select pushbuttons in the same line and the table speed suited to the boring operation in the metal involved shown as 160 r.p.m. in the chart of FIG. 29, is selected by means of the Speed select pushbuttons shown in this chart for line two of the panel. After the ram is moved downward at the selected feed rate with the workpiece turning at the selected table speed to engage the boring bit with the workpiece, when the boring bit has broken through, the R button at the left hand side of the panel is pressed in to stop the ram. The End Point buttons are then punched in to record the end point and the D button is restored.

With only the ram operative in this second machining step to advance the cutting tool, information as to the cutting tool position is provided by the Y converter via the control system including the end point signal lamps. To record the end point P2 for carrying out the second machining step automatically, requires that the End Point Position pushbuttons identified by the dark signal lamps at the top of the rows be punched in. With all requisite data as to Feeds, Speeds and direction of movement previously set into the second line, after recording the end point for this second machining step, the N pushbutton in the second line is then punched in thereby signifying for the repeat cycle that the third machining step will be carried out immediately following the second step. Through the control system including the N solenoid, the carriage 107 is stepped to the level of the third line of pushbuttons to record the data for carrying out this step repetitively.

Referring still to FIG. 24, the third step involves operating the ram in the Y+ direction at a relatively fast Feed rate, to withdraw the cutting tool to the end point P3 which is on the Y reference axis. This is achieved by pressing the U pushbutton, and selecting a high table speed and ram feed by means of the Feed and Speed select pushbuttons, thereby raising the ram to the third end point where the ram is stopped by operation of the Y+ limit switch which opens its contacts Y+lim–1 to de-energize the Y+ clutch coil. The End Point Position pushbuttons designating the third end point are identified by the dark signal lamps. In this case, the end point will similarly stop the ram in the repeat cycle.
case it is not required to punch in the End Point Position pushbuttons of line three since the limit switch Y+lim–1 will similarly stop the ram in the repeat cycle.

In the illustrative machining process, the fourth step is used for indexing the turret to rotate a boring bar into operative position to finish the previously bored hole. Only the indexing pushbutton IND and the N pushbutton, therefore, will be punched in, in the fourth horizontal line representing the requisite data for the fourth step. By means described in detail in the section entitled Turret Indexing, the turret will be indexed and the N solenoid will be actuated after the indexing step has been completed, to move the carriage 107 to the point behind the fifth line of pushbuttons.

In the fifth step, referring now to FIG. 25, the saddle is moved out engaging the Z-clutch to move the saddle and thereby position the boring bar to produce the proper diameter. Once the correct setting is found, the end point is recorded by punching in the End Point Position pushbuttons under the dark lamps. The information as to the sixth step is set into the panel pushbutton like it was for the second step and for the seventh step like it was for the third, and the eighth step is used for indexing.

In the ninth step, compound motion of the saddle and ram to move the cutting tool at 45° is used to position a boring tool now in the turret at the proper Z dimension to take a rough cut off the outer diameter of the workpiece. To move the cutting tool in such direction, the DOWN button D and the OUT button O is punched in. The end point P9 is obtained by using the scales or measuring devices. It will be recalled that the Z axis is the master axis for determining the end point with compound motion of the saddle and ram. The Z coordinate of the point P9 is, accordingly, the controlling dimension to be set into line nine of the pushbutton panel after the ninth step has been completed under manual direction. For this purpose, the pushbuttons of those rows identified by dark signal lamps with the cutting tool at the end point P9 will be pressed in thereby recording the Z coordinate of such end point.

Referring again to the schematic wiring diagram FIG. 22, it will be noted that both the DOWN and OUT buttons D and O punched in and the associated switches actuated, the Y bus is deenergized and the Z bus is energized. It will be evident, therefore, that the Z converter switches are effective to represent the Z coordinate of the saddle when at the ninth step end point P9 by energizing certain of the signal lamps.

Still referring to FIG. 26, the cutting tool is moved downward to the tenth end point P10 to make the rough cut. This is recorded by selecting the feed rate for the ram by means of the Feed select pushbutton according to the chart of FIG. 29. The DOWN button D will be punched in to move the ram in such direction. After setting in the tenth end point by means of the End Point Position pushbuttons, the N button in line ten is punched in to prepare for the eleventh machining step.

As will be noted from FIG. 26, in the eleventh step the saddle is moved in a short distance, only a few thousandths, to position the cutting tool to take a cut to finish the outer surface of the workpiece. This will usually be done by selecting a suitably slow feed rate. In this type of operation, involving tool movement under power only a few thousandths of an inch, such tool movement will usually be controlled by means of the Fine set of End Point Position pushbuttons on the control panel. Since the starting point is shown by the state of the signal lamps, the new end point just a few thousandths in one direction or the other from such starting point may readily be determined by the operator, and the new setting of the Fine pushbutton punched in. With feed rate and table speed set into the eleventh line, along with the end point data by means of the End Point Position pushbuttons, all the data is set in so that the step will be repeated automatically. In the twelfth step the finish cut is made by moving the ram upward and the ram may be raised to the Y reference axis so that the turret will be positioned for the thirteenth indexing step. Data for the twlefth step is shown in the chart of FIG. 29.

After the turret has been indexed in the thirteenth step, the facing cuts shown in FIG. 27 will be carried out. The ram will be moved downward in step fourteen to position the cutting tool to take a facing cut on the upper surface of the workpiecc adjacent its outer edge. The fourteenth end point must be set extremely accurately and, therefore, a test cut may be made and the piece measured in a trial and error procedure to find this end point. After it has been located, the end point P14 for the fourteenth step is then recorded by means of the End Point Position pushbuttons in the panel 106; the traverse feed rate may be used for moving the ram in the fourteenth step as shown in the chart of FIG. 29.

After the facing cut of the fifteenth step has been taken, using the illustrative Feeds and Speeds given in the chart of FIG. 29, in the sixteenth step, the ram is raised to position the facing tool which is in the turret, exactly to the proper dimension along the Y axis to face the upper surface of the workpiece hub in the seventeenth step. The latter step is then carried out under manual direction to complete the machining of the workpiece by moving the saddle in using the illustrative feed and speed given in the chart of FIG. 29. Steps eighteen through twenty index the turret to its position for step one and return the saddle and ram to the reference positions along the Y and Z axis from which the cycle may be repeated for a subsequent workpiece.

*Repeat cycle*

During the automatically controlled repeat cycle of the machine tool, the saddle or ram, or both, moves to a desired end point as set by the End Point Position pushbuttons on the panel. To appreciate how such a pushbutton setting operates through the control system to stop the saddle or ram at the end point, reference is made to the schematic wiring diagram, FIGS. 21–23, of the control system. It will be recalled that the End Point select switches are connected between the Y and Z buses and the C and F lines in individual circuits each also having the same numbered Y and Z converter switches.

With given End Point select switches actuated, thereby representing a given end point set into one control panel for a machining step, as this end point is approached the C line goes dead when the states of the Coarse and Medium Coarse switches 179C and 179MC of the operative converter match the states of the actuated End Point select switches. Accordingly, the C line goes dead when the saddle or ram reaches a point ahead of the actual end point determined by the amount of backlash in the Medium Coarse converter section. In theory the maximum amount of backlash provided with the construction herein shown would allow the cam stack 175MC to advance so that the converter switches 179MC are actuated approximately 1/4 inch before the actual end point. In practice it is preferred to provide a lesser amount of backlash so that the converter switches are actuated with 1/8 inch remaining, representing some portion of the sum of the increments assigned to the Fine and Medium Fine switches.

By means herein shown as the second set of slowdown-switch contacts ZAS–2, YAS–2 which are opened at the slowdown point, the +D.C. line 261 is disconnected from the parallel feed clutch coil circuits and the Feed select switches FS1–4 therein; the first set of slowdown switch contacts YAS–1, ZAS–1 are closed at the slowdown point thereby connecting the auxiliary circuit so that the latter bypasses the Feed select switches FS1–4 to obtain a relatively slow absolute feed velocity for the saddle or ram, so that the cutting tool will be moved at such relatively slow absolute velocity during the slowdown period and may be stopped without overtravel.

To obtain the relatively slow absolute velocity for the saddle or ram, an auxiliary circuit including switches FSa1–4 is provided to by-pass the Feed select witches FS1–4. Due to the arrangement wherein the Feed transmission is driven from the output of the table transmission as shown in Fig. 27, the absolute Feed rate of the saddle or ram depends on both the table speed and the output-to-input ratio of the Feed transmission as set by the Feed select switches. Table speeds available with the illustrated table transmission range from low to high, and Feed rates available from the Feed transmission likewise range from low to high relative to table speed. In carrying out this feature of the invention, the auxiliary circuit switches FSa1–4 are ganged to the Speed select switches SS1–4 such that the combinations of the latter providing higher table speeds actuate combinations of the auxiliary circuit switches FSa1–4 energizing feed clutch coils FC1–S, FC1–F and FC2–FC4 producing low feed rates, thereby to obtain low absolute feed velocities of the ram or saddle at such high table speeds. It will be noted, furthermore, that the combination of clutch coils in the feed transmission energized with any combination of speed select switches provides a slow feed rate. The same combination of feed clutch coils is energized via the auxiliary circuit to by-pass the traverse switch when the latter has been actuated to operate the saddle or ram at traverse speed.

To stop the ram or saddle at the end of the slowdown period with the cutting tool exactly at the given end point, only the Medium Fine and Fine circuits are operative. In the present case, the ram or saddle is stopped when the line F goes dead thereby de-energizing the Y+, Y—, Z+ or Z— clutch coil whichever happens to be energized and thereby stopping the saddle or ram.

The N solenoid is also caused to fall out responsive to the F line being de-energized thereby to step the carriage 107 to the next line of the control panel. In the present case, when the N pushbutton of a line on the panel is punched in, the N switch is actuated to its DOWN position connecting the N solenoid to the F line and taking it off the D.C. supply. When the F line is first energized at the start of any repeat machining step, this energizes the N solenoid and cocks the ratchet mechanism 156 of the carriage drive mechanism. When the F line goes dead representing the completion of the machining step recorded in that line of panel pushbuttons, the N solenoid is de-energized releasing the armature thereof, so that under the urging of a spring, for example, the armature strokes and operates the ratchet mechanism 156 to move the carriage 107. If at the completion of a step it is desired to stop operation, for a tool change for example, the N button is left out in the pushbutton line for that step. After tool change, automatic operation may be resumed merely by punching the N button, or by moving the carriage 107 to the next line, manually. Through this means automatic operation may be halted at the conclusion of any machining step.

*Repeat cycle—operational summary*

While the operation during the repeat cycle should be evident from the foregoing, it may be briefly summarized as follows: after the data for a machining process carried out first by hand, consisting of a plurality of steps (FIGS. 24–28), has been set in the course of that operation into the lines of the control panel corresponding to the number of steps, to carry out the repeat cycle with a new workpiece, the carriage 107 is preliminarily set at the top of the panel behind the first line of pushbuttons.

With the table rotating at a speed determined by the combination of first line Speed select buttons punched in, the saddle or ram will operate as selected by the punched in UP-DOWN-IN or OUT buttons on the first line at a feed rate determined by the Feed select buttons. Where a traverse speed is desired for the saddle or ram, as in the first step of the illustrative process illustrated in FIG. 24, such will be obtained where the T button of the first line is punched in.

Assuming that the first step involves saddle movement only, as in FIG. 24, with the IN button I punched in, the Z+ clutch coil will be connected to the C and F lines. The Z converter switches are actuated. Unless the saddle happens to be at the terminal end point, some chance combination of parallel circuits including the Z converter switches will energize the C or F line. Accordingly, the Z+ clutch coil will be energized to drive the saddle lead screw in the proper direction for the first machining step, when the Feed transmission provides the required power. In the present case, the slow speed complex of feed clutches as provided by the auxiliary circuit is normally energized to provide a slow speed drive connection to the Z+ clutch for the saddle lead screw. This is achieved through the connection to the +D.C. line 261 provided by the auxiliary circuit including the normally open switch FSa–4. With the slow speed feed clutch coil FC1–S initially energized through this connection, after a momentary period of such energization, during which the saddle lead screw will start to rotate, the feed transmission is shifted to produce the selected Feed rate. To this end the auxiliary slowdown switch ZAS is actuated which deenergizes the auxiliary circuit and energizes the parallel feed clutch coil circuits so that the selected feed clutch coils FC1–S, FC1–F and FC2–FC4 are selectively energized. Thereafter the saddle is operated at the selected feed rate.

At the start of the first step, the auxiliary magnetic clutch 248 energized via the C line (FIG. 23) and the magnetic clutch rotor 248–R is rotated with the saddle lead screw turning at the slow speed to actuate the slowdown switch ZAS and also to rotate the rod carrier 250 so that the rods 252 of the Z converter engage and thereby actuate all Fine switches 179F. With the latter switches actuated, the F line is energized regardless of the combination of Medium Fine and Fine End Point Position pushbuttons latched in, in line one of the panel.

The saddle will travel at the selected feed rate until the slowdown operation is effective to automatically reduce the feed rate to a relatively low absolute velocity. An illustration of the states of the converter switches during the slowdown operation is found in FIG. 30. As shown in this chart, where the end point is set illustratively at one inch, the Medium Coarse converter switches 179MC shift to the state representing one inch from the state representing ¾ inch where the saddle is .249 inch ahead of the actual end point. It will be understood that this is the theoretical limit of the advance and in practice the arrangement might be used where the slowdown point is ⅛ inch or less ahead of the actual end point to reduce the time required to complete the slow travel. All Fine switches are actuated as shown in FIG. 20 during saddle travel prior to slowdown due to the action of the converter rods 252. By means of such rods, the fingers are lifted from the cams of the Fine stack when this cam is rotated at high speed, to prevent damage to the fingers or switches. Prior to the slowdown point the F line is guarded against going dead by leaving the Medium Fine switches in cam contact. The C line also guards the F line through the diode 280; and momentary nulls occurring in the circuits including the Fine and Medium Fine switches while the saddle is moving toward the end point at the traverse speed, or normal fast feed rates will, consequently, not cause the F line to become de-energized and thereby de-energize the Z or Z− clutches and the ram lead screw Y+ or Y− clutches before terminal end point.

Responsive to the de-energization of the C line at the slowdown point, the Z converter magnetic clutch Za is de-energized thereby releasing the converter carrier 250 so that the rods 252 are shifted to their median position (FIG. 11) by the spring fingers 182 associated with the Fine switches. The states of such switches for the illustrative case where the saddle has traveled .750 inch and the end point equals one inch, is shown in line two of the chart in FIG. 30. The slowdown switch ZAS is also de-actuated opening the second set of contacts ZAS–2 thereof (FIG. 21) to de-energize the feed clutch coil circuits and closing the first set of contacts thereof to energize the auxiliary circuit and thereby a combination of feed clutch coils FC1–S, FC1–F and FC2–FC4 providing a slow absolute feed velocity for the saddle.

During the final less than ¼ inch distance of travel at the slow feed rate, the Fine and Medium Fine Z converter switches 179F, 179MF change state, as partially illustrated in the chart of FIG. 30. At the actual end point the state of such switches matches the combination of Fine and Medium Fine End Point select switches actuated by the End Point Position pushbuttons in line one of the panel, causing the F line to go dead. Responsive to de-energization of the F line, the Z+ clutch coil is de-energized uncoupling the Feed transmission from the saddle lead screw, and the saddle stops. The N solenoid is also de-energized releasing the solenoid armature so that its stroke through the ratchet mechanism 156 shifts the carriage to line two of the panel. The operation is the same for subsequent machining steps as for the first machining step of line one, and, therefore, the sequence begins with the complex of feed clutch coils energized via the auxiliary circuit and the Z+, Z−, Y+ or Y− clutch coil (FIG. 23) becoming energized from the C line to start the saddle or ram lead screw turning.

Where compound motion of the ram and saddle is involved, the operation is the same in the repeat cycle as just described, since the Z axis is considered the controlling axis and the Z bus is energized while the Y bus is not energized. Slowdown and stopping of the ram and saddle is, therefore, controlled by the Z converter slowdown switch ZAS and comparison of the states of the Z converter switches with the End Point select switches.

The operation is similar in the repeat cycle where only ram travel and movement of the cutting tool in the Y direction is involved, except that the Y bus is energized in this case, not the Z bus, and the Y converter is effective through its slowdown switch YAS and converter switches 179 to control slowdown and stopping.

I claim as my invention:

1. In a system including a machine tool and means for controlling the tool to perform a series of machining steps in accordance with a stored program, the combination comprising: a movable tool element, a source of power for positioning said tool element along a particular axis, an analog to digital converter operably connected to said tool element for producing a set of impulses representing in binary digital code the instantaneous position of said tool element along said axis, program recording means adapted to receive manually set-in data for each machining step and including a plurality of lines of bistable elements with the elements in each line being manually operable to represent in like binary digital code a desired end point position for said tool element in a single machining step, and control means including means for coupling said power source to move said tool element toward the desired end point in each machining step, a comparison circuit for connection between each line of bistable elements and said converter and effective to produce an output pulse responsive to impulses from said converter matching the states of said bistable elements in one line, means for uncoupling said power means to stop said tool element at the completion of each machining step responsive to said output pulse, and means for connecting said comparison circuit successively to each line of bistable elements following the completion of each machining step.

2. In a system including a machine tool and means for controlling the tool to perform a series of machining steps in accordance with a stored program, the combination comprising: a movable tool element, a source of power for positioning said tool element along a particular axis, an analog to digital converter operably connected to said tool element for producing a set of impulses representing in straight binary digital code the instantaneous position of said tool element along said axis, program recording means adapted to receive manually set-in data for each machining step, said means including a control panel having a plurality of lines of pushbuttons with the pushbuttons in each line having assigned values of increments of tool element movement representing a straight binary code, a carriage mounted behind said control panel for movement from line to line of said pushbuttons, a line of switches carried by said carriage for individual actuation, respectively, by a single line of said pushbuttons, means for latching punched in pushbuttons to represent in straight binary code a desired end point position for said tool element in a single machining step, and control means operated by said switches and said converter for carrying out successive machining steps responsive to the end point data in successive lines of said pushbuttons.

3. In a system including a machine tool and means for controlling the tool to perform a series of machining steps in accordance with a stored program, the combination comprising: a movable tool element, a source of power for positioning said tool element along a particular axis, an analog to digital converter operably connected to said tool element for producing a set of impulses representing in straight binary digital code the instantaneous position of said tool element along said axis, program recording means adapted to receive manually set-in data for each machining step, and including a plurality of lines of bistable elements with the elements in each line being manually operable to represent in like binary digital code end point position data for said tool element in a single machining step, and control means for carrying out successive machining steps responsive to the data stored in successive lines of bistable elements of said recording means including means for selectively coupling said power source to said tool element to move said tool element toward the desired end point in each machining step and to stop said tool element at the completion of each step responsive to impulses from said converter matching the states of the corresponding line of said bistable elements.

4. In a system including a machine tool and means for controlling the tool to perform a series of machining steps in accordance with a stored program, the combination comprising: a movable tool element positionable along a particular axis, an analog to digital converter operably connected to said tool element for producing a set of impulses numerically representing the instantaneous position of said tool element along said axis, program recording means adapted to receive manually set-in data for each machining step, said means including a control panel having a plurality of lines of pushbuttons with the pushbuttons in each line having assigned values of increments of tool element movement corresponding to the numerical system of the converter, a carriage mounted behind said control panel for movement from line to line of said pushbuttons, a line of switches carried by said carriage for individual actuation, respectively, by a single line of said pushbuttons, means for latching punched in pushbuttons to represent a desired end point position for said tool element in a single machining step, and control means operated by said switches and said converter for carrying out successive machining steps responsive to the end point data in successive lines of said pushbuttons.

5. In a system including a machine tool and means for controlling the tool to perform a series of machining steps in accordance with a stored program, the combination comprising: a movable tool element, a source of power for positioning said tool element along a pair of perpendicularly disposed axes, an analog to digital converter operably connected to said tool element for producing a set of impulses numerically representing the instantaneous position of said tool element along a selected axis during a given machining step, program recording means adapted to receive manually set-in data for each machining step, and including a plurality of lines of bistable elements with the elements in each line being manually operable to represent in a like numerical system end point position data for said tool element in a single machining step along a selected axis, and control means for carrying out successive machining steps responsive to the data stored in successive lines of bistable elements of said recording means including means for selectively coupling said power source to said tool element to move said tool element along the selected axis toward the desired end point in each machining step and to stop said tool element at the completion of each step responsive to impulses from said converter matching the states of the corresponding line of said bistable elements.

6. In a system including a machine tool and means for controlling the tool to perform a series of machining steps in accordance with a stored program, the combination comprising: a movable tool element, a source of power for positioning said tool element along either of two right angularly disposed axes, an analog to digital converter operably connected to said tool element for producing impulses numerically representing the instantaneous position of said tool element along each said axis, program recording means adapted to receive manually set-in data for each machining step, said means including a control panel having a plurality of lines of pushbuttons with the pushbuttons in each line having assigned values of increments of tool element movement according to the same numerical system, and control means including bistable means actuated by said pushbuttons for selective comparison with impulses from one of said converters for carrying out successive machining steps each involving tool element movement to an end point on one of said axes.

7. In a system including a machine tool and means for controlling the tool to perform a series of machining steps in accordance with a stored program, the combination comprising: a tool element movable along a pair of perpendicularly disposed axes, signal generating means for producing signals numerically representing the instantaneous position of said tool element along a selected axis during a given machining step, program recording means adapted to receive manually set-in data for each machining step, said recording means having a plurality of lines of manually operable elements with the elements in each line having assigned values of increments of tool element movement along a selected axis corresponding to the numerical system of said generating means, and means associated with each of said manually operable elements in a line and actuated by said signal generating means for indicating the instantaneous position of said tool element as the latter moves along a selected axis, so that with said tool element at a machining step end point on said selected axis, said indicating means represents the manually operable elements to be actuated to set-in the address for that machining step end point.

8. In a system including a machine tool and means for controlling the tool to perform a series of machining steps in accordance with a stored program, the combination comprising: a tool element movable along a pair of perpendicularly disposed axes, an analog to digital converter operably connected to said tool element for producing a set of impulses numerically representing the instantaneous position of said tool element along a selected axis during a given machining step, program recording means adapted to receive manually set-in data for each machining step, said means including a control panel having a plurality of lines of manually operable elements with the elements in each line having assigned values of increments of tool element movement along a selected axis corresponding to the numerical system of said converter, and means including a signal lamp associated with each of said manually operable elements in a line and actuated by said converter for visually indicating the instantaneous position of said tool element as the latter moves along a selected axis, so that with said tool element at a machining step end point on said selected axis, the states of said lamps identify the manually operable elements to be actuated to set-in the address for that machining step end point.

9. In a system including a machine tool and means for controlling the tool to perform a series of machining steps in accordance with a stored program, the combination comprising: a movable tool element positionable along a pair of perpendicularly disposed axes, program recording means adapted to receive manually set-in data for each machining step, said means including a control panel having a line of manually operable elements, an indicating device associated with each element, said devices having assigned values of increments of tool element movement according to numerical system, and means including a signal generating means operably connected to said tool element to produce impulses for actuating said indicating devices according to said numerical system so as to indicate by the state of said devices the instantaneous position of said tool element as the latter moves along a selected axis.

10. In a system including a machine tool and means for controlling the tool to perform a series of machining steps in accordance with a stored program, the combination comprising: a movable tool element positionable along a particular axis, program recording means adapted to receive manually set-in data for each machining step, said means including a control panel having a plurality of lines of bistable elements with the elements in said lines being further arranged in transverse rows, a signal lamp associated with each row of elements with the signal lamps having assigned values of increments of tool element movement according to a binary digital code, and means including an analog to digital converter operably connected to said tool element to produce impulses for actuating said signal lamps according to said binary digital code so as to visually indicate by the state of said signal lamps the instantaneous position of said tool element as the latter moves along said axis.

11. In a system including a machine tool and means for controlling the tool to perform a series of machining steps in accordance with a stored program, the combination comprising: a movable tool element positionable along a particular axis, program recording means adapted to receive manually set-in end point data for each machining step, said means including a pushbutton keyboard having a plurality of lines of pushbuttons with the pushbutton in said lines being further arranged in transverse rows, a signal lamp associated with each row of pushbuttons with the signal lamps having assigned values of increments of tool element movement according to a straight binary code, and means including an analog to digital converter operably connected to said tool element to produce impulses for actuating said signal lamps so that the latter indicate by their state the instantaneous position of said tool element as the latter moves along said axis.

12. In a machine tool having a table and cross-rail mounted in overlying relation to the table, the combination comprising, a saddle mounted on said cross-rail for movement therealong, a slide mounted on said saddle for vertical movement relative thereto, a tool carried by said slide, a first lead screw for positioning said saddle along the horizontal axis of said cross-rail, a second lead screw for positioning said slide along the vertical axis, a source of power, a plurality of feed clutches for selectively coupling said power source to said lead screws to provide tool movement in both directions along each axis at different feed rates, an analog to digital converter operably connected to each said lead screw for producing impulses numerically representing the instantaneous position of said tool along each said axis, program recording means adapted to receive manually set-data for a plurality of machining steps, said means including a control panel having a plurality of lines of pushbuttons with certain pushbuttons in each line having assigned values of increments of tool movement according to the same numerical system, and other pushbuttons in each line corresponding to said feed clutches, and control means including bistable means actuated by said pushbuttons for selective comparison with impulses from one of said converters for carrying out successive machining steps each involving tool movement to an end point on one of said axes, said control means further including means actuated by said other pushbuttons for engaging a combination of said feed clutches to provide tool movement in the direction and at the feed rate programmed for each said machining step.

13. In a machine tool having a table and cross-rail mounted in overlying relation to the table, the combination comprising, a saddle mounted on said cross-rail for movement therealong, a slide mounted on said saddle for vertical movement relative thereto, a tool carried by said slide, a first lead screw for positioning said saddle along the horizontal axis of said cross-rail, a second lead screw for positioning said slide along the vertical axis, a source of power, a plurality of feed clutches for selectively coupling said power source to said lead screws to provide tool movement in both directions along each axis at different feed rates, an analog to digital convertor operably connected to each said lead screw for producing impulses numerically representing the instantaneous position of said tool along each said axis, program recording means adapted to receive manually set-in data for a plurality of machining steps, said means including a control panel having a plurality of lines of pushbuttons with certain pushbuttons in each line having assigned values of increments of tool movement according to the same numerical system, and other pushbuttons in each line corresponding to said feed clutches, control means including bistable means actuated by said pushbuttons for selective comparison with impulses from one of said converters for carrying out successive machining steps each involving tool movement to an end point on one of said axes, said control means further including means actuated by said other pushbuttons for engaging a first combination of said feed clutches to provide tool movement in the direction and at the feed rate programmed for each said machining step, and slow-down means operated by said converters during each machining step responsive to said tool reaching a predetermined distance ahead of the end point for said machining step, for engaging a second combination of said feed clutches providing a slow, absolute feed velocity for completing tool movement to the end point without overtravel.

References Cited by the Examiner

UNITED STATES PATENTS

| | | | |
|---|---|---|---|
| 2,427,493 | 9/47 | Bullard | 192—142 |
| 2,528,736 | 11/50 | Bullard | 192—142 |
| 2,838,963 | 6/58 | Good et al. | 192—142 |
| 2,866,183 | 12/58 | Awot et al. | 340—347 |
| 2,892,526 | 6/59 | Devaud | 192—142 |
| 2,929,055 | 3/60 | Wahlstrom. | |
| 2,943,251 | 6/60 | Hull | 318—162 |
| 2,958,859 | 11/60 | Lentz et al. | |
| 2,970,307 | 1/61 | Bentley et al. | 340—347 |
| 3,007,096 | 10/61 | Tripp | 318—162 |
| 3,024,610 | 3/62 | Ulman | 192—142 |
| 3,072,833 | 1/63 | Kerr et al. | 318—162 |
| 3,101,435 | 8/63 | Welch et al. | 318—162 |

OTHER REFERENCES

Giddings & Lewis, "Numericord," Bulletin NR1, p. 8 only.

Giddings & Lewis Mach. Tool Co., Fond Du Lac, Wisconsin, U.S.A., Received U.S. Patent Off., Sept. 12, 1955.

DAVID J. WILLIAMOWSKY, *Primary Examiner.*

RICHARD H. EANES, Jr., *Examiner.*